(12) United States Patent
Stöcker

(10) Patent No.: US 11,094,122 B2
(45) Date of Patent: Aug. 17, 2021

(54) AUGMENTED REALITY SYSTEM

(71) Applicant: Carsten Stöcker, Hilden (DE)

(72) Inventor: Carsten Stöcker, Hilden (DE)

(73) Assignee: innogy Innovation GmbH, Essen (DE)

( * ) Notice: Subject to any disclaimer, the term of this patent is extended or adjusted under 35 U.S.C. 154(b) by 14 days.

(21) Appl. No.: 16/229,361

(22) Filed: Dec. 21, 2018

(65) Prior Publication Data

US 2019/0122443 A1 Apr. 25, 2019

Related U.S. Application Data

(63) Continuation of application No. PCT/EP2016/064723, filed on Jun. 24, 2016.

(51) Int. Cl.
*G06T 19/00* (2011.01)
*H04L 29/08* (2006.01)
*H04L 29/06* (2006.01)

(52) U.S. Cl.
CPC .......... *G06T 19/006* (2013.01); *H04L 67/104* (2013.01); *H04L 67/141* (2013.01); *G06T 2219/024* (2013.01); *H04L 67/38* (2013.01)

(58) Field of Classification Search
CPC combination set(s) only.
See application file for complete search history.

(56) References Cited

U.S. PATENT DOCUMENTS

| 8,639,739 B1* | 1/2014 | Pope | G06Q 10/101 |
| | | | 709/201 |
| 9,007,473 B1* | 4/2015 | Worley, III | G06K 9/00201 |
| | | | 348/211.11 |
| 2009/0254843 A1 | 10/2009 | Van Wie et al. | |

(Continued)

FOREIGN PATENT DOCUMENTS

WO WO 2006/012610 A2 2/2006

OTHER PUBLICATIONS

Anonymous/Wikipedia, "Peer-to-peer," Internet Webpage, Section: "Creating more resilient and scalable computer networks", Apr. 28, 2014, 14 pages.

*Primary Examiner* — Andrew G Yang
(74) *Attorney, Agent, or Firm* — Reinhart Boerner Van Deuren P.C.

(57) ABSTRACT

The invention relates to an augmented reality system having a first augmented reality device and a second augmented reality device. The first augmented reality device includes a first communication module at least temporarily connected with a second communication module of the second augmented reality device via at least one data connection during an augmented reality session. Also included is a peer-to-peer network having a peer-to-peer application configured to access a second communication data set related to the second communication module. The peer-to-peer application includes a controlling means that controls the establishment of the data connection between the first communication module and the second communication module by providing the second communication data set to the first communication module via a peer-to-peer module assigned (Continued)

to the first augmented reality device such that the first communication module establishes the data connection based on the provided second communication data set.

16 Claims, 6 Drawing Sheets

(56) References Cited

U.S. PATENT DOCUMENTS

| | | |
|---|---|---|
| 2010/0146085 A1 | 6/2010 | Van Wie et al. |
| 2010/0281521 A1* | 11/2010 | Sakakihara ............. G06F 21/40 726/3 |
| 2011/0238751 A1* | 9/2011 | Belimpasakis ......... G06F 3/011 709/204 |
| 2013/0212228 A1 | 8/2013 | Butler et al. |
| 2016/0188861 A1* | 6/2016 | Todeschini .............. G06F 21/32 726/7 |
| 2017/0032573 A1* | 2/2017 | Dow ...................... G06F 21/602 |
| 2017/0139977 A1* | 5/2017 | Batra .................. G06F 16/2365 |
| 2017/0244721 A1* | 8/2017 | Kurian .................. H04L 63/105 |
| 2017/0359740 A1* | 12/2017 | Dintenfass ............ H04W 24/04 |

* cited by examiner

AUGMENTED REALITY SYSTEM

CROSS-REFERENCE TO RELATED PATENT APPLICATION

This patent application is a continuation of PCT/EP2016/064723, filed Jun. 24, 2016, the entire teachings and disclosure of which are incorporated herein by reference thereto.

FIELD

The invention relates to an augmented/virtual reality system comprising at least one first augmented reality device and at least one second augmented reality device. The invention relates further to a method for operation an augmented reality device, an augmented reality device and a peer-to-peer application.

BACKGROUND

Nowadays, augmented reality systems and/or virtual reality system are used in several applications. Non-exhaustive examples of augmented/virtual reality applications are entertainment applications, such as virtual reality entertainment applications, gaming applications, medical applications, navigation applications, ambient living applications, constructions applications, assisted working applications, vehicle operations applications, machine operations applications, and the like.

An augmented/virtual reality system comprises at least two augmented/virtual reality devices. At least one generation device may be configured to provide real-world image data, such as a video, overlaid with one or more additional information element(s) to a visualization device. For example, on the visualization device e.g. a video of the real-world can be displayed wherein the video comprises additional information element(s), such as additional text, icons, pictures, acoustical elements, etc.

In case of a virtual reality system a generation device may be configured to create digital image data set(s) based on based on at least one provided source image data set (e.g. computer algorithm(s)) and at least one provided information element data set (e.g. data with no or some real world data input). The generation device may be configured to provide created digital image data set(s) to a visualization device.

It is noted that in this patent application a virtual reality system is understood—as a special use case of an augmented reality system. This means, in particular, that in the following claims and description, an augmented reality system comprises an augmented reality system and/or a virtual reality system, and an augmented reality device comprises an augmented reality device and/or a virtual reality device. More particularly, the term "augmented reality" means (always) "augmented reality and/or virtual reality".

By way of a medical augmented reality system example, an augmented reality system can provide a surgeon with one or more additional information element(s) which are otherwise hidden, such as showing the heartbeat rate, the blood pressure, the state of the patient's organ, etc. with a real-world video. For instance, an augmented reality system can be used to let a doctor look inside a patient by combining one source of information element(s), such as an X-ray image, with another source of information, such as video.

Common to all augmented reality systems according to prior art is that an augmented reality system comprises a central controlling device and two or more augmented reality devices.

FIG. 1 shows an embodiment of an augmented reality system 100 according to prior art. The depicted augmented reality system 100 comprises a first augmented reality device 102 in form of a generation device 102 and three exemplified second augmented reality devices 104, 106, 108. The depicted generation device 102 comprises an augmented reality engine 110 configured to create at least one augmented reality image data set, in particular, an augmented reality video based on at least one provided source image data set and at least one provided information element data set.

For instance, the source image data set in form of one or more data packets can be provided by a second augmented reality device 108 in form of a data source device 108. By way of example, a drone 108 comprising a camera module 112 can be provided. The video data set created by the camera module 112 can be transmitted via a data connection 114 to the generation device 102. In particular, a second communication module 116 of the second augmented reality device 108 is configured to transmit the one or more source image data set(s) to a first communication module 118 of the generation device 102.

The further second augmented reality device 106 may comprise a sensor module 120 with one or more sensors configured to measure and/or detect one or more parameter(s). The at least one parameter value, e.g. health data, a temperature or other meteorological parameter, may be provided to a second communication module 122 of the further second augmented reality device 106. The communication module 122 may be configured to transmit the at least one measured parameter value in form of an information element data set to the generation device 102. In particular, via a further data connection 124, the second communication module 122 may send one or more data packets comprising the at least one information element data set to the first communication module 118 of the generation device 102.

As described above, the augmented reality engine 110 is configured to create at least one augmented reality image data set based on the data sets of the second augmented reality devices 106, 108. For instance, an augmented reality video data set can be created wherein the video data provided by the drone 108 is superimposed by the one or more information element(s) provided by the further second augmented reality device 106.

The created augmented reality image data set(s) can be provided to a further second augmented reality device 104 in form of a visualization device 104. The created augmented reality image data set(s) can be transmitted by a (further) first communication module 126 of the generation device 102 to a second communication module 128 of the visualization device 104 via a further data connection 130.

The visualization device 104, such as a mobile device (e.g. mobile phone, tablet computer, glasses, etc.), may comprise a visualization module 132 configured to display the provided augmented reality image data set(s). For instance, a (real-time) video created by the drone 108 and comprising additional information element(s) can be displayed.

As can be seen from FIG. 1, the system 100 comprises separated devices 102, 104, 106, 108. In order to produce and display the desired reality image data set(s) it is required to establish secure data connections 114, 124, 130 between two or more of the respective devices 102, 104, 106, 108. However, the establishment of data connections 114, 124, 130 between the devices 102, 104, 106, 108 is causing practical problems, in particular, when different augmented reality sessions require different system structure with different devices and/or different data connections.

For instance, for a first augmented reality session, a first set of augmented reality devices have to be connected (at least partly) with each other and for a further augmented reality session, a second set of augmented reality devices have to be connected (at least partly) with each other. Thereby, the first and second sets may comprise at least partly different devices. In order to control the establishment of secure data connections, prior art systems 100 comprise a central controller 134, in particular, in form of a server 134 or a network device 134.

The central controller 134 may be configured to establish secure data connections between trusted augmented reality devices. In order to control and manage the establishment of data connections, a complex connection establishment process must be performed between the augmented reality devices 104, 106, 108, 102 on the one side and the central controller 134 on the other side. It shall be understood that the central controller 134 might be integrated in one in one of the augmented reality devices 102, 104, 106, 108.

For instance, every augmented reality device 102, 104, 106, 108 may transmit (confidential) data comprising e.g. address data, identification data, etc. to the central server 134 via further communication connections 137 and a communication module 139 of the central server 134. The central server 134 checks the received data and may—after a positive check—control the establishment of the data connections. The respective devices 102, 104, 106, 108 may establish respective data connections 114, 124, 130 orchestrated by the central controller 134. After the termination of the augmented reality session, the central controller 134 may control the disconnection of the data connections.

However, a disadvantage of such augmented reality systems is the server-client structure of these systems. Usually, the at least one central controller is formed as one or more server(s). The first augmented reality device(s) and/or second augmented reality device(s) are formed as clients of the server. The server controls the establishment of the data connections. A disadvantage of server-client structures of this kind, particularly the server (or platform), apart from the high transaction costs, is that the central instance or central server manages confidential data, such as address data and identification data. A persistent problem affecting the central instance is that of protecting the confidential data stored on one or more servers from access by unauthorized third parties. In particular, a high degree of security expenditure is required, in order to prevent said data from being tampered with. This in turn leads to higher transaction costs. A further disadvantage is the complex and costly infrastructure for providing the described server-client structure. Furthermore, several messages have to be exchanged with the central server resulting in a complex process for establishing the one or more data connections. Further, the server-client system is inflexible.

Therefore, the object of the present invention is to provide an augmented reality system with at least one first augmented reality device and at least one second augmented reality device, wherein the establishment of a data connection between the at least two augmented reality devices is controlled in a secure and, at the same time, simple and flexible manner.

BRIEF SUMMARY

The above object is solved according to a first aspect of the invention by an augmented reality system (including virtual reality system) as described herein. The augmented reality system comprises at least one first augmented reality device and at least one second augmented reality device. The first augmented reality device comprises at least one first communication module at least temporarily connected with at least one second communication module of the second augmented reality device via at least one data connection during at least one augmented reality session. The augmented reality system comprises at least one peer-to-peer network comprising at least one peer-to-peer application configured to access at least one second communication data set related to the second communication module. The peer-to-peer application comprises at least one controlling means configured to control at least the establishment of the data connection between the first communication module and the second communication module by providing at least the second communication data set to the first communication module via at least first one peer-to-peer module assigned to the first augmented reality device such that the first communication module is capable to establish the data connection based on the provided second communication data set.

In contrast to prior art augmented reality systems, according to the present invention, the establishment of one or more data connections between two or more (separated) augmented reality devices is securely controlled by means of a peer-to-peer application of a peer-to-peer network. In particular, the setting up of an augmented reality system for at least one augmented reality session can be controlled by a peer-to-peer application by causing the securely connecting of two or more augmented reality devices without a central instance. By the fact that instead of a central server or a platform, a peer-to-peer network (also called a framework) undertakes the in particular tamper-proof controlling of the establishment of an augmented reality system, in particular, the control of the establishment (and disconnection) of one or more data connections by means of a peer-to-peer application, high security standards are achieved in that preferably all computers (peer nodes or simply nodes) in the peer-to-peer network, at least a part of the peer computers in the peer-to-peer network, monitor(s) at least the correctness of such an establishment. The transaction costs can be significantly reduced. No central, superior platform, server, cloud, etc. is required. The complexity of managing and controlling an augmented reality system can be significantly reduced. In particular, different set-ups of augmented reality systems can be established for different augmented reality sessions in a simple and flexible manner.

The augmented reality system comprises at least two augmented reality devices to be connected with each other in order to transmit at least unidirectional one or more augmented reality data set(s). The data connection can be a standard data connection, in particular, a wireless data connection, such as a Bluetooth connection, WLAN connection, infrared connection, mobile radio connection, etc. During an augmented reality session, the at least two separated augmented reality devices may be at least temporarily connected to each other. After the augmented reality session, the connection might be disconnected.

The augmented reality system comprises at least one first peer-to-peer module. A peer-to-peer module is configured to communicate with at least one peer-to-peer application of at least one peer-to-peer network e.g. by reading data from the peer-to-peer application and/or by writing data to the peer-to-peer application. Generally, according to the present application, reading data comprises, in particular, receiving of one or more messages from the peer-to-peer application.

Writing data comprises, in particular, transmitting of one or more messages to the peer-to-peer application.

The first peer-to-peer module is at least assigned to the at least one first augmented reality device. Preferably, each first peer-to-peer module is uniquely assigned to a respective first augmented reality device. For instance, each first augmented reality device can comprise a first peer-to-peer module. Preferably, the first peer-to peer module is integrated in the first augmented reality device.

It is also possible that a communication connection is provided between the first augmented reality device and the first peer-to-peer module assigned to said first augmented reality device. This means that the first peer-to-peer module can at least communicate and/or act on behalf of the first augmented reality device. For example, the first peer-to-peer module can be partly formed by a separate processing device, such as mobile communication device (e.g. mobile phone, mobile computer, etc.), or it can run on a remote stationary processing device (e.g. in a data center). In case of a mobile communication device or a remote processing device the at least one first augmented reality device may have a secure communication channel to the processing device (or mobile communication device) of the data center and the processing device itself may have a connection to the peer-to-peer network. In an embodiment the remote processing device may be a gateway to the peer-to-peer network. This means that the first augmented reality device can securely communicate via its first peer-to-peer module and the gateway to the peer-to-peer network. In other words, at least the first augmented reality device may be a node of the peer-to-peer network.

In comparison to a client server augmented reality system in which a server provides a service for data connection and a client uses the service in order to establish the data connection, these roles are cancelled in the present peer-to-peer network. Each participant (e.g. node) of the peer-to-peer network can use a service and the like and offer such a service. In particular, a peer-to-peer network is self-determined and/or self-organized (without any higher-level units). In the present case preferably each node, respectively, of the peer-to-peer network, at least a part of the nodes of the peer-to-peer network comprises the peer-to-peer application, i.e. executes the peer-to-peer application, in particular, the controlling means. The first peer-to-peer module may be a peer and node, respectively, of the peer-to-peer network. In other words, at least the first augmented reality device may be a node of the peer-to-peer network.

The setting up of a particular structure of an augmented reality system comprising two or more desired augmented reality devices is controlled and managed by the peer-to-peer application, in particular, the controlling means of the peer-to-peer application. In particular, the controlling means may control the setting up by providing communication data set(s) required to establish one or more data connection(s) in accordance with a desired structure of the augmented reality system to the respective augmented reality devices. The controlling means provides at least one second communication data set related to the second communication module to the first communication module.

The second communication data set may comprise communication data required for establishing a data connection between the first communication module and the second communication module. For instance, a second communication data set can comprise at least one of: address data of the second communication module, identification data (unique identifier) of the second communication module, data about the capabilities of the second communication module (maximum data rate, supported communication protocols, etc.), encryption data (e.g. at least one encryption key configured to provide an encrypted data transmission), trigger information (e.g. information which initiated the actual establishment of the data connection), etc.

The controlling means provides the at least one second communication data set via the first peer-to-peer module to the first communication module. For instance, the first peer-to-peer module can read the second communication data set from the peer-to-peer application (under the control of the controlling means) and may forward the read second communication data set to the first communication module. It may be possible that the second communication data is at least temporarily stored in a local storage of the first augmented reality device. The first communication module is configured to establish the data connection with the second communication module based on the provided second communication data set.

The list of all (anonymised or pseudoanonymised) participants or devices of the at least one peer-to-peer network can preferably be made known to each participant of the peer-to-peer network. A module according to the present invention, such as a peer-to-peer module, communication module, camera module, sensor module, actor module, human machine interface, console, process system, external data source, etc. can be at least partially formed by a software module and/or at least partially formed by a hardware module.

According to a first embodiment of the augmented reality system according to the present application the augmented reality system may comprise at least one second peer-to-peer module assigned to the second augmented reality device. The controlling means may be configured to control the establishment of the data connection by providing at least one first communication data set related to the first communication module to the second communication module via the second peer-to-peer module. Preferably, the controlling means of the peer-to-peer application can provide communication data sets to each of the involved communication modules of a data connection to be established. For instance, the first communication data set can comprise at least access information (e.g. at least an identifier and/or address data of the first communication module). The access information may inform the second communication module that a first communication module may request for the establishment of a data connection between the first and second communication modules. The access information may comprise communication data of the other communication module, e.g. identification data and/or address data. In addition, as described above, a communication data set may comprise further data.

In an embodiment, devices may be registered, as will be described in more details hereinafter. A registered device may be configured to identify other registered device and can start sending peer-to-peer message(s) to the other device(s). Üeer-to-peer messages can be signed, encrypted, hashed and/or time stamped. A recipient device may validate the authority of a messaged by validating the signature of the sender and the sender's ID.

By providing both involved communication modules with respective first and second communication data sets, a data connection can also be established between two devices if at least one of the two augmented reality devices may comprise a security means, such as a firewall or a VPN connection. Network protocol information or quality parameters for establishing a connection may be exchanged as well, e.g. network Quality of Service (QoS) or bandwidth parameters.

Since both communication modules are informed about all necessary communication data for establishing a data connection, the security means may be adapted such that a data connection can be established. For instance, a security means may not block a request message of a first communication module comprising access information, e.g. identification data and/or address data, which correspond to a previously received communication data set via a peer-to-peer module.

Furthermore, a peer-to-peer module may be configured to provide at least one (previously described) communication data set related to at least one communication module of at least one augmented reality device associated with said peer-to-peer module to the peer-to-peer application. The peer-to-peer application may store the communication data set, such as a first or second communication data set, in the peer-to-peer application and/or in a storage arrangement controlled by the peer-to-peer application. The peer-to-peer application (e.g. controlling means) is configured to access the stored communication data set(s) in order to provide one or more of the communication data set(s) to respective peer-to-peer modules.

According to a further preferred embodiment of the present invention, the peer-to-peer application may be configured to generate at least one augmented reality transaction agreement about at least the establishment of a data connection during at least one augmented reality session, in particular, at least prior to the establishment of the data connection between the at least two augmented reality devices. The peer-to-peer application may be configured to store the generated augmented reality transaction agreement, in particular, in the peer-to-peer application. The at least one augmented reality transaction agreement may comprise details about the set-up and structure, respectively, of the augmented reality system during a specific augmented reality session. For instance, all involved augmented reality devices and the one or more data connection(s) may be specified in an augmented reality transaction agreement. During an augmented reality session an augmented reality process can be conducted by the augmented reality system built for said augmented reality session. After the augmented reality session, e.g. after the augmented reality process is terminated, the two or more augmented reality devices may be disconnected.

The controlling means may be preferably configured to control the establishment (and disconnection) of one or more data connections based on the generated augmented reality transaction agreement. Thereby, it may be possible that the controlling means is part of a generated augmented reality transaction agreement, in particular, in form of code executable by at least a part of the nodes of the peer-to-peer network. Two or more augmented reality transaction agreements may be generated in order to set-up two or more (different) augmented reality systems with e.g. different augmented reality devices and/or different data connections. In an automatic, and thus, simple manner, different augmented reality system structures can be established under the control of the peer-to-peer application.

It shall be understood that a set-up of an augmented reality system during a specific augmented reality session may be also specified in two or more (coupled) augmented reality transaction agreements.

Generally, the generation of the augmented reality transaction agreement can be caused or initiated by at least one peer-to-peer module of at least one participant of the peer-to-peer network. Preferably, the augmented reality system may comprise at least one request entity comprising at least one peer-to-peer module. The request entity may be a computing device, user, etc. entitled to set-up an augmented reality system. Thereby, the request entity may be an augmented reality device. For instance, a visualization device may be also a request entity configured to allow e.g. a user to request for a set-up of a desired augmented reality system in order to obtain desired augmented reality image data set(s). In particular, the peer-to-peer module of the request entity may be configured to cause generating of the augmented reality transaction agreement by transmitting at least one request message to the peer-to-peer application. The request message may comprise details about the desired structure of the augmented reality system. In particular, the request message may comprise at least two augmented reality devices to be connected to each other. In particular, a suitable code and, where necessary, at least one key (e.g. signature) for verifying the sender of a message (e.g. sending request entity) and/or the authenticity of a message can be transmitted to the peer-to-peer application or written into the peer-to-peer application by a peer-to-peer module. The augmented reality transaction agreement may be generated between two entities, such as the request entity and the at least one provider entity of at least one augmented reality device. Preferably following a confirmation (acceptance) message from the provider entity (or from the peer-to-peer application) comprising a suitable instruction and, where necessary, at least one key (e.g. signature) for verifying the sender of the confirmation message, a corresponding augmented reality transaction agreement can be advantageously generated following a check by the peer-to-peer network of the peer-to-peer application. Expressed in simple terms, each entity can search for one or a plurality of suitable partners by means of the peer-to-peer network or the peer-to-peer application and an augmented reality transaction agreement can be generated by means of the peer-to-peer application. The generation of an augmented reality transaction agreement can easily be caused by means of a request entity.

According to a further embodiment of the augmented reality system, the generated augmented reality transaction agreement may comprise at least one of:
  augmented reality criterion,
  augmented reality duration condition, in particular, an augmented reality start condition and/or an augmented reality end condition,
  identifier assigned to the first augmented reality device,
  identifier assigned to the second augmented reality device,
  information that the first and second augmented reality device should be connected
  at least one communication data set, in particular, at least the first communication data and the second communication data, and
  at least one augmented reality action.

As described above, the augmented reality transaction agreement may comprise (technical) detail(s) about a set-up of the augmented reality system during/for at least one (specific) augmented reality session. Preferably, identifiers of all involved augmented reality devices can be stored in the augmented reality transaction agreement. At least the identifier assigned to the first augmented reality device and the identifier assigned to the second augmented reality device can be stored in the augmented reality transaction agreement. By specifying the at least two augmented reality devices in this way, the controlling means can easily identify the involved augmented reality devices and may preferably by able to provide said devices with the respective communication data set (also) based on the stored identifiers.

Alternatively or preferably additionally, at least one augmented reality duration condition may be stored in the augmented reality transaction agreement. An augmented reality duration condition may define the duration of an augmented reality session. The peer-to-peer application may store augmented reality generation, sensor and external data, the generated output for a visualization device including sound/voice, events captured by human machine interfaces and/or triggered actors. For instance, a specific (fixed or flexible) time duration can be stored as an augmented reality duration condition. Thereby, a start time and an end time may be stored as augmented reality start condition and augmented reality end condition, respectively. It may be also possible that alternatively or additionally the fulfillment of a particular task, such as the recording of a particular number of objects, the recording of image start from a start location to an end location of a movable augmented reality device, such as a mobile augmented reality device (e.g. drone) having at least one camera module or the like, can be used as an augmented reality duration condition. Recordings may be encrypted and access to the encrypted recordings is governed by the augmented reality transaction. In an embodiment validation or auditing systems may be given access to the stored recording. Thereby, the fulfillment of a task may be an augmented reality end condition of a first augmented reality session/process and at the same time an augmented reality start condition of a subsequent augmented reality session/process (e.g. with an amended augmented reality system structure). The augmented reality duration condition may define the duration of an augmented reality session.

Alternatively or preferably additionally, at least one augmented reality criterion may be stored in the augmented reality transaction agreement. The augmented reality criterion may be a financial value to be transferred from an account of a request entity to an account of e.g. the provider entity of one or more augmented reality devices.

In addition, an augmented reality transaction agreement may alternatively or additionally comprise at least one identifier and/or authentication data/means for a user, augmented reality template data, augmented reality recording and storing data, augmented reality algorithms and/or visualization processing data including cognitive analytics, human-machine interaction and/or control rules, and/or access data for an access to external data sources Furthermore, at least one previously described communication data set, preferably, all required communications data set for the set-up of the desired structure may be stored in the augmented reality transaction agreement (and/or at another storage location with a link to the respective storage locations).

An augmented reality device may be capable of conducting one or more different augmented reality action(s). In the augmented reality transaction agreement, it can be stored which of the available augmented reality actions/functions is released at least temporarily during an augmented reality session. Available functions/actions may be available camera module(s), available human machine interface(s), available actor(s) or actor module(s), available sensor module(s) and/or sensor(s) of a sensor module, available augmented reality engine(s), available storing devices, and the like.

According to a preferred embodiment, the augmented reality action comprises at least one of:
  transmitting of at least one generated augmented reality image data set, in particular, via the at least one data connection,
  transmitting of at least one source image data set, in particular, via the at least one data connection, and
  transmitting of at least one information element data set, in particular, via the at least one data connection.

Alternatively or additionally, one or more structure templates of one or more different augmented reality system structures can be stored in the peer-to-peer application and/or a storage arrangement controlled by the peer-to-peer application. A structure templates may comprise all data required for setting-up said structure (e.g. identifiers of all involved augmented reality devices, information about the data connections, communication data sets, design/structures of visualization patterns, etc.). Each structure template may be associated with a unique structure template identifier. Then, it may be possible to store (merely) said structure template identifier in an augmented reality transaction agreement. Additionally, further data, such as an identifier of the request entity, augmented reality criterion, augmented reality duration condition, etc., can be stored in the augmented reality transaction agreement.

According to a further embodiment of the augmented reality system according to the present invention, the controlling means may be configured to provide at least one trigger information to at least the first peer-to-peer module. The trigger information may be configured to initiate the establishment of the data connection by the first communication module. For instance, the trigger information may represent a time point or other start condition. Thereby, the trigger information may be configured such that the establishment of the data connection is started only upon reaching the time point and/or fulfillment of the start condition. The trigger information may be included in a provided communication data set and/or may be transmitted at a later time point, e.g. upon reaching the time point and/or fulfillment of the start condition. Preferably, the controlling means may be configured to provide the trigger information based on the generated augmented reality transaction agreement. In particular, the trigger information may be based on an augmented reality duration condition (e.g. start condition or stop condition).

A further start condition can be an user authentication event. Prior to start of an augmented reality session a registered user may need to authenticate himself, e.g. via a biometric authentication sensor. It shall be understood that this sensor can be included in an augmented reality device, such as a visualization device.

In an embodiment the controlling means may be configured to set a trigger information based on geographic and/or position data. A 'geo fencing' condition can be established, e.g. start and/or stop a trigger based on the information if an individual or a augmented reality device is in a specific area.

Further, in an embodiment controlling means may configure an augmented reality engine to process position, motion or movement data of a user or augmented reality device(s). For instance visualization data in virtual reality games can be calculated and updated in real time.

According to a particularly preferred embodiment, the peer-to-peer application may comprise at least one registration means configured to receive a registering message of at least one peer-to-peer module of a request entity. Alternatively or additionally, the at least one registration means may be configured to receive a registering message of at least one peer-to-peer module of an augmented reality device. The registration means may be configured to register the request entity by storing a unique (peer-to-peer) identifier of the request entity and/or to register the augmented reality device by storing a unique (peer-to-peer) identifier of the augmented reality device.

An entity, device, unit or the like can be registered in the peer-to-peer application as e.g. a so called smart asset. Each registered entity and/or device can be stored with its unique (peer-to-peer identifier) e.g. in one or more identifier list(s) of authorized request entities and/or augmented reality devices. According to an embodiment of the augmented reality system according to the present invention, at least one peer-to-peer module may be configured to cause a registration of the entity and device, respectively, (or the corresponding peer-to-peer module) in the peer-to-peer application (or network) by transmitting a registering message comprising at least an identifier assigned to the entity (device) and/or peer-to-peer module. The identifier might be already a peer-to-peer identifier or another identifier suitable to uniquely identify the entity. The (unique peer-to-peer) identifier may be a serial number or a smart asset hash of e.g. the entity, the user's name of the entity, a communication address of an augmented reality device, a signature, etc. If e.g. the identifier is not already a unique peer-to-peer identifier, e.g. if the identifier is a name of a network device, the peer-to-peer application, in particular, the registering means, may be configured to generate a unique peer-to-peer identifier for the respective entity/device (according to preset rule(s)). In particular, the registering means of the peer-to-peer application may register the respective entities/devices by storing at least the peer-to-peer identifier in an identifier list in the peer-to-peer application and/or a storage arrangement controlled by the peer-to-peer application.

Prior to the registration of an request entity, provider entity, augmented reality device or the like, at least part of the nodes (peers) of the peer-to-peer network may check whether the registering requirements (such as specific entity specifications or valid signatures or compliance requirements) predefined by the peer-to-peer network are met by the entity/device requesting registration. For instance, it may be necessary that an augmented reality device meets predefined technical specifications. In order to perform the check, preferably, further data may be included in the registering message. In particular, the peers of the peer-to-peer network may provide registering rules or registering requirements which must be fulfilled by an entity, augmented reality device or the like to be regarded as a trustful entity. Rules/requirements may be individually defined by the peers of a peer-to-peer network. E.g. it may be necessary that a new entity must be recommended by an entity which is already a participant of the peer-to-peer network. In addition, it may be necessary that this participant must have a reputation factor which increases a predefined minimum reputation factor.

Furthermore, according to a preferred embodiment, in the registration process, a peer-to-peer module of an augmented reality device may additionally provide at least a part of the data of a communication data set relating to at least one communication module of said augmented reality device. The registration means can be configured to store each identifier of an augmented reality device together with said one or more communication data set(s) relating to respective communication module(s) of the augmented reality device. For instance, said data can be stored in the peer-to-peer application and/or in a storage arrangement controlled by the peer-to-peer application. Then a controlling means may be configured to access a required communication data set(s) (merely) based on the identifier(s) stored in an augmented reality transaction agreement.

Furthermore, according to a preferred embodiment, in the registration process, a peer-to-peer module of an augmented reality device may additionally provide an identity, access and/or role management function. It shall be understood that the augmented reality system might register user(s) in the peer-to-peer application. The registration means can be configured to store user identifier and/or authentication data and user role data (e.g. engineer, designer). Registered user(s) can authenticate themselves to get access to visualization outputs and/or to human machine control rules depending on their role. The peer-to-peer application may provide an identity, access and role management function via the register.

As previously described, it may be possible that in return to a grant of a request to set-up a desired augmented reality system structure, the request entity has to fulfill at least one generated augmented reality criterion prior to the augmented reality session, during the augmented reality session and/or after the augmented reality session. According to one embodiment, the peer-to-peer application may be configured to cause the conduction of an augmented reality criterion transaction based on at least one augmented reality criterion of the stored augmented reality transaction agreement, preferably, stored in the peer-to-peer application. For instance, the augmented reality criterion may be a financial value. Financial values can be (instantaneously) exchanged with a transaction via a cryptocurrency. In an alternative or additional embodiment micropayment channels may be used for a (constant) payment stream that can be handled e.g. partly off-chain to reduce the amount of on-chain transactions. In a further embodiment so called state channels or state networks (e.g. Raiden Network) may be used to exchange digital tokens off-chain in a secure way. Opening and/or closing of state channels may be registered on the peer-to-peer application. This means that individual transactions may not be stored on the peer-to-peer application in order to improve scalability and avoid movement tracking of pseudonyms on the peer-to-peer application. According to the present invention, a man-in-the-middle is not necessary. Fully automated processes from authentication to charging and billing can be provided.

Moreover, the controlling means may be configured to control the establishment of the data connection by conducting at least one authorization process at least prior to providing the second communication data set via the first peer-to-peer module to the first communication module. In particular, to ensure a high security, only authorized request entities may be allowed to request for the generation of an augmented reality transaction agreement. In the authorization process, the controlling means executed by at least part of the nodes of the peer-to-peer network may check the authorization of the request entity (including a user using a (request) entity). Only if all of this part of the nodes comes to the (same) positive result, the request entity may be regarded as an authorized request entity. In a similar way, it can be checked by the controlling means in an authorization process, whether a requested augmented reality device is an authorized augmented reality device.

In an embodiment authorization check can be conducted based on registered identities and signed messages sent among the augmented reality devices.

According to a preferred embodiment, the controlling means may be configured to conduct the authorization process based on at least the stored identifiers of the registered request entities and the identifier of the request entity requesting the generation of an augmented reality transaction agreement. For instance, the identifier of the request entity requesting, in particular, sending a request message by its peer-to-peer module can be compared with the identifiers of the registered identifiers e.g. of an identifier list. The generation of an augmented reality transaction agreement may be only allowed if the identifier of the request entity requesting the generation of the augmented reality agreement corresponds to at least one of the stored identifiers. Otherwise, the generation of the augmented reality agreement may be denied. The security can be further improved.

An augmented reality device may be any kind of device configured to conduct at least a part of at least one of the above described augmented reality actions. For instance, an augmented reality device may be a cloud arrangement configured to transmit e.g. by streaming an augmented reality image data set, e.g. video data, to a visualization device via a data connection. According to a preferred embodiment, at least one of the first augmented reality device and the second augmented reality device is at least one of:

generation device comprising at least one augmented reality engine configured to create at least one augmented reality image data set based on at least one provided source image data set and at least one provided information element data set, and/or
  data source device configured to provide at least one information element data set and/or source image data set, and/or
  visualization device configured to display at least one augmented reality image data set.

A generation device may comprise one or more augmented reality engine(s). An augmented reality engine may be a computation engine configured to create at least one augmented reality image data set based on two provided raw data sets. In particular, at least one source image data set, such as (real-time and/or real-world) video data created by a camera module of a data source device, can be fed to the augmented reality engine. In addition, at least one information element data set created by at least one sensor module of the same data source device and/or at least one further data source device can be fed to the augmented reality engine. The augmented reality engine may process the at least two provided data sets by superimposing the respective data sets with each other. In particular, the video data can be superimposed with one or more information element(s). The generation device may be formed by one or more stationary or mobile computing devices including gaming consoles or human machine interfaces.

Furthermore, a generating device according to the invention includes a generating device configured to capture a video and/or data stream. A generating device can be connected to a data source device that provides data for algorithmic creation of digital images and/or for overlaying data from external data sources (e.g. market, environmental data, engineering data, etc.).

A data source device may comprise at least one of:

sensor module with one or more sensor(s) configured to measure/detect at least one event/parameter,
  camera module with one or more camera(s) configured to create at least one (real-time) source image data set, and
  data sources, data feeds or process systems.

In a preferred embodiment one or more data feed(s) may be implemented as so called smart oracles in the peer-to-peer application.

The sensor module may comprise one or more sensor(s) configured to measure/detect at least one event/parameter, such as environmental parameter, physiological parameter, etc. The sensor module may be configured to create at least one information element data set based on the one or more measured/detected event(s)/parameter(s). The information element data set(s) may be transmitted to one or more augmented reality engine(s) e.g. by forwarding the data set to a communication module configured to transmit the information element data set(s) to a further communication module via the data connection. A data source device may be a stationary or mobile computing device.

The visualization device may comprise at least one visualization module configured to visualize a provided augmented reality image data set, such as a real-time video with superimposed one or more information element(s). The visualization module may be a projecting module and/or a display module, such as a television set, a computer monitor, a head-mounted display, a broadcast reference monitor, a medical monitor, a touch display or the like. Exemplified visualization devices include mobile phones, tablet computers, beamers, glasses, monitors, etc.

It shall be understood that a physical augmented reality device can be a combination of two or more of the previously described augmented reality devices. For instance, a single device may comprise an augmented reality engine and a sensor module and/or camera module and/or visualization module and/or a human-machine interface and/or an authentication device. E.g. a visualization device can be combined with a generating device (e.g. combination of augmented reality glasses with a camera module). These two augmented reality devices can be formed by or integrated into a single physical augmented reality device.

Further augmented reality devices can be included into an augmented reality system in order to e.g. authenticate users, to provide data, to generate visualization data or to establish a human machine interface to trigger events/activities. Further examples are:

Authentication devices, e.g. biometric authentication,
  Human machine interaction device,
  Actor module,
  Terminal for input data,
  Gaming console,
  Assisted surgery or working console,
  Movement tracking sensor, orientation sensor and/or motion sensor, including wearables or body sensors,
  Process management systems (e.g. MES, SCADA, Telemetry, ERP),
  GPS sensor,
  Microphone,
  Security camera systems,
  External data sources, e.g. databases,
  AR engines,
  Output devices for sound/voice, smell or haptic forces,
  Decentral storage arrangements, and
  Cognitive computing devices.

Users may need to authenticate themselves prior to using the system. Via a human machine interface users can trigger actors. Control messages to the actors and status of actors can be visualized in the output for a visualization device. External data gathered from data sources or process systems might be included in the visualization as well.

The present augmented reality system can be preferably used for one of the following augmented reality applications:
- entertainment applications, e.g. virtual reality applications,
- gaming applications,
- medical applications,
- navigation applications,
- ambient living applications,
- construction applications,
- assisted working applications,
- vehicle operations applications, and
- machine operations applications.

According to a further preferred embodiment, the at least one peer-to-peer application can be a decentralized register or a shared database configured to store data, e.g. augmented reality transaction agreement(s), identifier(s), communication data set(s), permission data set(s), with given certain proofs or signatures. In addition to e.g. identifiers, the decentral register can store computer code acting as e.g. controlling means for controlling at least the establishment of one data connection, preferably, for controlling the establishment of a individually configured augmented reality system structure for each augmented reality session. In particular, the code can be invoked by a transaction to the address of the code in so called 'smart contracts'. This code can be processed on the node(s), at least a part of the nodes, of the decentral register.

A decentralized register can be readable at least by a part of the participants of the peer-to-peer network. In particular, every computer node, augmented reality device and/or request entity e.g. including at least one respective peer-to-peer module can comprise the peer-to-peer application. The decentralized register, at least the public part (i.e. may be without private contracts) may be read at least by each participant of the peer-to-peer network. In particular, all peer-to-peer modules and all other computers of the peer-to-peer network can preferably read all information in the peer-to-peer application formed as a register. Preference is also that all peer-to-peer modules and all other computers of the peer-to-peer network can send messages to or write messages to the peer-to-peer application. A message or transaction sent to a smart contract may start the execution of a code of the smart contract (e.g. the controlling means which may be part of a generated augmented reality transaction agreement) while using data stored in the smart contract. For instance, sending a request message may start the execution of code for conducting an authorization process and/or for generating an augmented reality transaction agreement. Another example may be the detection of the fulfillment/reaching of a augmented reality duration condition (e.g. start condition) resulting in the execution of code for causing the establishment of at least one data connection, preferably, causing the setting-up of a desired augmented reality system structure. The security can be significantly enhanced since the code is executed by at least a part of the nodes (e.g. at least two nodes) of the peer-to-peer network. According to one embodiment, at least a part of the nodes of the peer-to-peer network may be configured to execute at least the controlling means of the peer-to-peer application.

The peer-to-peer application can be built upon the following elements: peer-to-peer network comprising Consensus System/Protocol, Data Structure, Merkle Trees, Public Key Signatures, *Byzantine* Fault Tolerance. It may replicate data based on a consensus principle. It may be auditable and traceable.

In a simple way information can be made available to preferably all participants. This may allow to carry out a review of the information stored in the decentral register or the code executed in the decentral register. Particularly preferably, each computer in the peer-to-peer network can be configured to review new information, in particular, based on older information stored in the peer-to-peer application. In addition, the at least one controlling means may be monitored by at least a part of the nodes of the peer-to-peer network, preferably by all nodes. A manipulation of a controlling means can thus be prevented, at least detected.

Moreover, preferably each computer can in each case comprise the complete data content, but include at least a portion of the data contents of the peer-to-peer application, in particular, of the decentral register. For example, it may be provided that after a positive verification of written information in the peer-to-peer application this information is saved by all nodes, at least by a part of the nodes. For instance, after the generation of an augmented reality transaction agreement and/or after a successful registration, the agreement and identifier, respectively, can be stored at least by a part, preferably all nodes of the peer-to-peer network. The tamper resistance of the data stored in the peer-to-peer application can thereby be further improved. E.g. an augmented reality process or augmented reality criterion transaction can be securely controlled.

In order to store new information in a tamper-proof way, the peer-to-peer application can comprise encryption means and/or signature means and/or verification means, wherein at least one of the encryption means and/or signature means and/or verification means is configured to store data, such as an augmented reality transaction agreement (s), identifier(s), communication data set(s), permission data set(s), etc. In particular, it can be provided that by the hash function a link is established with at least one previously stored information in the decentral register. Further data, such as request messages, ordinary, contextual and/or transaction data of an entity, such as a network device, can be stored.

The peer-to-peer application may be formed by a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In a particularly preferred embodiment of the present system, the peer-to-peer application can be a block chain or decentral ledger comprising at least two blocks coupled to each other (e.g. Ethereum Block chain with Smart Contracts). The block chain technology or "decentral ledger technology" is already used in the payment by means of a crypto currency, such as Bitcoin. It has been recognized that by a particular configuration of a block chain, at least the correctness of a received or provided data and of conducted processes, such as a process for establishment of an augmented reality system structure, can be checked without the need of a central server. E.g. a controlling means can be easily implemented as a smart contract in a block chain. An augmented reality system can be managed in an easy and flexible manner.

In addition, the block chain can be used to generate predefined action(s) caused by at least one peer-to-peer module and/or a controlling means in a tamper-proof manner. The block chain according to the present embodiment is particularly a decentralized, peer-to-peer-based register in which all data related to at least one augmented reality session/process can be logged. A block chain is particularly suitable as a technical means to replace a central entity/server in a simple and secure manner.

In further embodiments of the peer-to-peer application, the block chain can be a permissionless or permissioned block chain. In a specific case the block chain can be public, consortium or private block chain.

In a further embodiment, the peer-to-peer application can be formed by multiple block chains which are connected via mechanisms such as side chains or smart contracts. A peer-to-peer node can run one or more different blockchain clients.

Data of the peer-to-peer application can be stored on the "decentral ledger technology" and/or the decentral ledger steers (encrypted) data storage accessible via the internet and preferably in de-central data storage, object store and database, respectively, such as Interplanetary File System (IPFS) or storj or in a distributed Blockchain database (e.g. BigChainDB). Access to encrypted data to third party entities is managed via the permission means formed as one or more smart contract(s) on the block chain.

In addition, data feeds can be provided by the peer-to-peer application (so called "smart oracles"). Data feeds can provide further information element(s) relating to an augmented reality image data set from at least one further source. For instance, further weather data or financial market data can be provided by a data service provider. Data can be captured from trusted sources off-chain and stored on the block chain or stored via the block chain on a decentral data storage entity.

Information among peer-nodes can be exchanged by a peer-to-peer messaging system. This means a peer node can send a message to another peer node to submit an information or to trigger an action. Messages can be clear text, signed, hashed, time-stamped and/or encrypted. This means that not all data exchanged among peer nodes must be stored on the block chain.

In a further embodiment, the at least one peer-to-peer network can be formed by a plurality of computer nodes and a peer-to-peer module, such as the first peer-to-peer module of a first augmented reality device, the second peer-to-peer module of a second augmented reality device entity, etc. A peer-to-peer module may be only configured to communicate with the plurality of nodes. In other words, the peer-to-peer module is not a node of the peer-to-peer network but only a participant. Such a peer-to-peer module does not comprise the peer-to-peer application but only provides an interface module, such as an application programming interface (API), and a decentral application for communication with the computer nodes of the peer-to-peer network or the peer-to-peer application, such as a block chain or a smart contract on the block chain. For instance, such a peer-to-peer module can either send clear text or encrypted information or generate a secure connection (e.g. tunnel) to a peer-to-peer gateway (or so called "remote node") in order to communicate with the peer-to-peer network. This allows reducing the required processing power of the peer-to-peer module.

In one implementation of the peer-to-peer network, there can be only one validating peer or full node, e.g. only one node can be configured to perform a validation process, e.g. conducting an access authorization evaluation, and one or more observing (or monitoring) nodes. An observing node can validate transactions to establish a trust level but does not validate all transactions which is done by the validating peer.

In an alternative embodiment, the peer-to-peer module is one of the computer nodes. In this case, the peer-to-peer module comprises at least a part of the peer-to-peer application. In particular, the peer-to-peer module can comprise preferably the total data content of the peer-to-peer application or can access the information stored in another node. For instance, the peer-to-peer module might be a so called "light node" or a decentral application (DAPP) connected to a remote node.

It is noted that in the present case, according to an embodiment, the peer-to-peer module comprises at least an API configured to communicate with the peer-to-peer application, such as the block chain. In addition to the API, the peer-to-peer module comprises a decentral application of software comprising local algorithms at least configured to create and transmit data to the peer-to-peer application via the API. The decentral application so called "Dapp" is at least configured to process and transmit said data.

Preferably, the data is signed or encrypted or can be transmitted via a cryptographically secured tunnel or a secured internet connection to a peer-to-peer node running the peer-to-peer application, such as the block chain. In another particular embodiment, also the peer-to-peer application itself is implemented in the peer-to-peer module, i.e. the peer-to-peer module is a node of the peer-to-peer network comprising the decentral application, the API and the peer-to-peer application, such as the block chain or decentral ledger.

Data and transactions stored on the block chain do not provide "transactional privacy". Transactions between pseudonyms may be (often) stored in clear text on the block chain. In some cases data stored on the block chain are encrypted and the keys may be handled via the block chain. Transactions between pseudonyms are stored in clear text on the block chain. Privacy preserving, secure transactions or execution of computer code can be achieved with cryptographic tools such as zero knowledge (zk) proofs or zk Succinct Non-interactive Arguments (zk-SNARK). Transactions or algorithms are separated into two parts: a smart contract on the block chain and a private contract. A privacy preserving protocol ensures the privacy of data and the correctness of code execution (SNARK verification is done via the smart contract on chain). The private contract computation can be done by a set of nodes, off-chain computers or done in measured launch environment or a secure hardware enclave for attestation and sealing that cannot be manipulated by other software code running on the devices. In an alternative embodiment secure Multi-Party-Computing (sMPC) systems can be used for transactional privacy. Examples for privacy preserving protocols and computation are HAWK and MIT Enigma.

With zero knowledge proof (zk Proofs) the parties can see that the algorithm is executed correctly in a private contract, but the input data are not disclosed to the party. In addition selective privacy can be achieved by sharing keys to decrypt transactions for reporting and auditing purposes.

Similarly, in an alternative embodiment a particularly large peer-to-peer network may be divided in two or more (physical or logical or dynamically virtual) clusters. In a corresponding peer-to-peer network, for example, a validation (of a subset of transactions) may only be carried out by the members of one cluster (a subset of nodes; e.g. sharding of a block chain to improve the scalability). In a further embodiment the peer-to-peer application can be formed using multiple block chains. These block chains are connected via frameworks such as sidechains or smart contracts.

A further aspect of the present invention is a method for operating an augmented reality system, in particular, a previously described augmented reality system. The method comprises:

- at least temporarily establishing at least one data connection between at least one first communication module of at least one first augmented reality device and at least one second communication module of at least one second augmented reality device during at least one augmented reality session,
- controlling the establishment of the data connection by at least one controlling module of at least one peer-to-peer application of at least one peer-to-peer network by providing at least one second communication data set related to the second communication module to the first communication module via at least one first peer-to-peer module assigned to the first augmented reality device such that the data connection is established by the first communication module based on the provided second communication data set.

Temporarily establishing at least one data connection includes the establishment of the data connection during the total augmented reality session or during only a portion of the total augmented reality session. This can include granting temporary access to a visualization data stream.

Another aspect of the present invention is an augmented reality device of at least one augmented reality system, in particular, a previously described augmented reality system. The augmented reality device comprises at least one first communication module configured to establish at least one data connection to at least one second communication module of at least one second augmented reality device during at least one augmented reality session. The augmented reality device comprises at least one first peer-to-peer module configured to receive at least one second communication data set related to the second communication module from at least one controlling means of at least one peer-to-peer application of at least one peer-to-peer network. The first communication module is configured to establish the data connection based on the received second communication data set.

Preferably, prior to establishing a data connection prerequisites, such as an user authentication, may be checked.

A still further aspect of the invention is a peer-to-peer application of at least one peer-to-peer network. The peer-to-peer application comprises at least one controlling means configured to control at least the establishment of at least one data connection between at least one first communication module of at least one first augmented reality device and at least one second communication module of at least one second augmented reality device during at least one augmented reality session by providing at least one second communication data set related to the second communication module to the first communication module via at least one first peer-to-peer module assigned to the first augmented reality device such that the first communication module is capable to establish the data connection based on the provided second communication data set.

The peer-to-peer application can be, in particular, used for flexibly establishing different augmented reality system structures/architectures for one or more augmented reality sessions.

The features of the methods, systems, modules, peer-to-peer applications, augmented reality devices and computer programs can be freely combined with one another. In particular, features of the description and/or the dependent claims, even when the features of the dependent claims are completely or partially avoided, may be independently inventive in isolation or freely combinable with one another.

These and other aspects of the present patent application become apparent from and will be elucidated with reference to the following figures. The features of the present application and of its exemplary embodiments as presented above are understood to be disclosed also in all possible combinations with each other.

DETAILED DESCRIPTION

Figure 1:
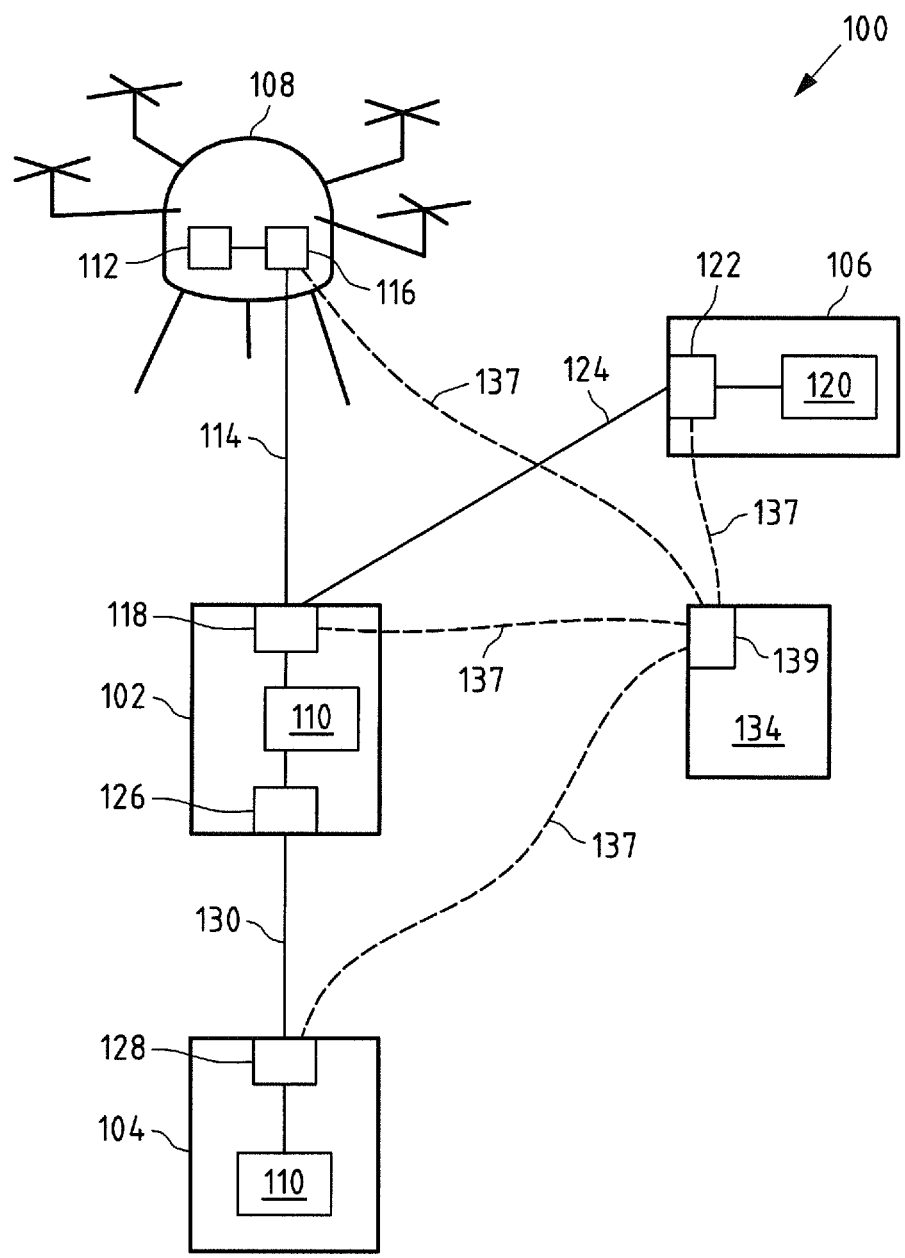
FIG. 1 shows a schematic view of an augmented reality system according to prior art.

Like reference numerals in different figures indicate like elements.

Figure 2:
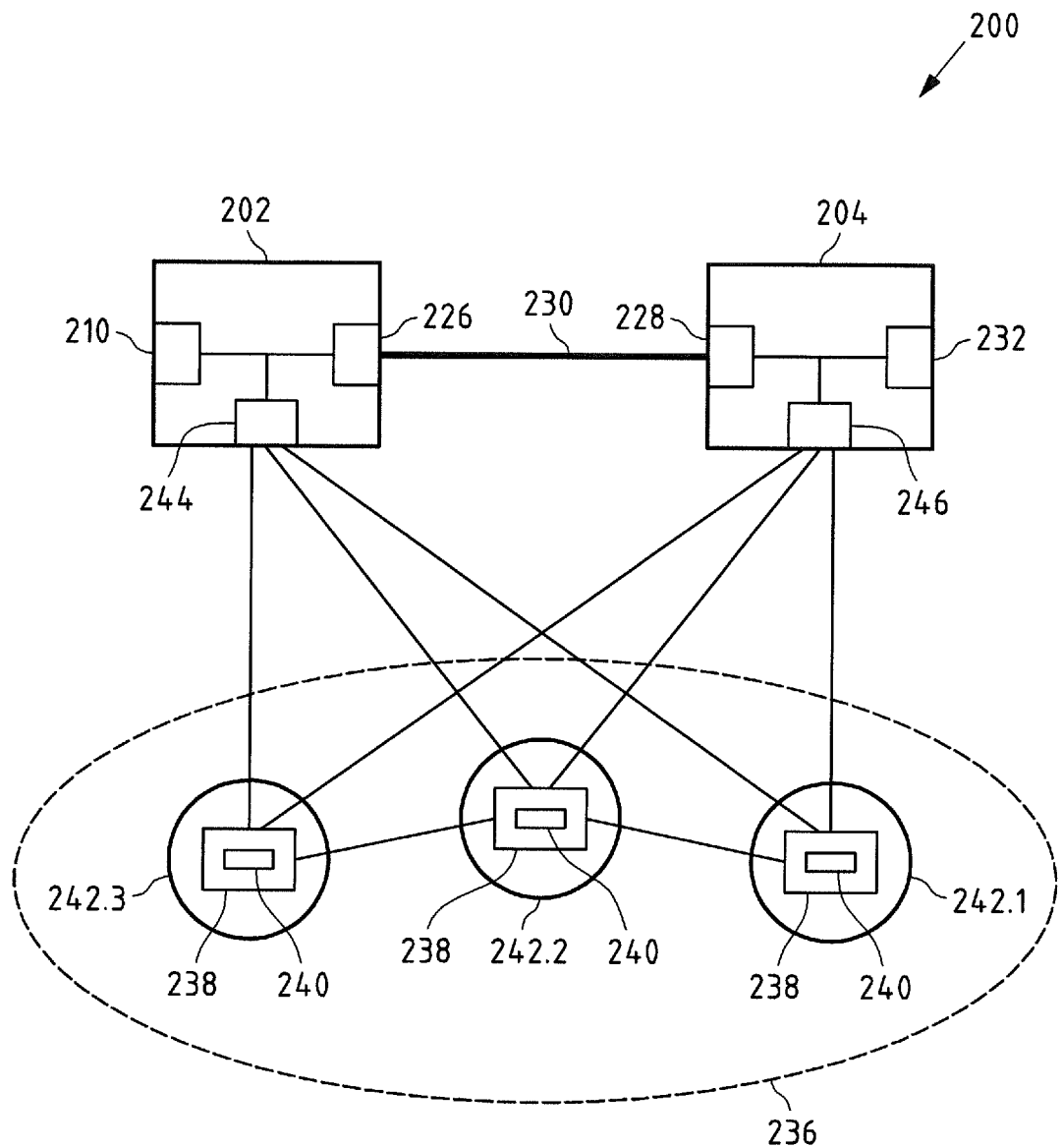
FIG. 2 shows a schematic view of a first embodiment of an augmented reality system according to the present invention.

FIG. 2 shows a schematic view of an embodiment of an augmented reality system 200 according to the present invention. The depicted augmented reality system 200 comprises two augmented reality devices 202, 204. A first augmented reality device 202 may be a generation device 202 and a second augmented reality device 204 may be a visualization device 204.

It is noted that in case of a augmented reality system 200 in form of a virtual reality system 200 the generating device can comprise an augmented reality engine providing at least one augmented reality image data set in form of digital images based on software algorithms, input data and virtual reality parameters.

The generation device 202 comprises an augmented reality (computation) engine 210 configured to create at least one augmented reality image data set, in particular, an augmented reality video based on at least one provided source image data set and at least one provided information element data set. The visualization device 204 comprises a visualization module 232, e.g. a display configured to display at least one provided augmented reality image data set. For instance, the visualization module 232 can be configured to display an augmented reality video to one or more user(s).

As can be seen from FIG. 2, the augmented reality devices 202, 204 are separated augmented reality devices 202, 204. In order to transmit data form one device to another, a data connection 230 can be established between a first communication module 226 of the first augmented reality device 202 and a second communication module 228 of a second augmented reality device 204. The data connection 230 is, in particular, temporarily established during an augmented reality session/process. Preferably, the data connection 230 is established in order to conduct at least one augmented reality action, such as the transmission of at least one augmented reality image data set from the generation device 202 to the visualization device 204.

The at least one data connection may be generally formed by one or more standard network connection(s), such as a Bluetooth connection, WLAN (Wireless Local Area Network) connection, mobile radio connection, etc. The communication modules may comprise suitable transceiver(s) for communicating via the at least one physical standard network connection. It shall be understood that an augmented reality device may comprise two or more (different) communication modules configured to establish two or more (different) data connections.

A substantial difference compared with prior art augmented reality systems, such as augmented reality system 100 according to FIG. 1, is that no central instance and/or third party organization is provided. In the present case, the augmented reality system 200 comprises a peer-to-peer network 236 or a computer-computer network 236. The peer-to-peer network 236 comprises a plurality of nodes 242.1, 242.2, 242.3 and computers 242.1, 242.2, 242.3, respectively. A peer-to-peer network 236 is characterized in the present case in that each node 242.1, 242.2, 242.3 and/or participant 244, 246 is preferably connectable at least to every other node 242.1, 242.2, 242.3 and/or participant 244, 246. For instance, at least one physical standard network (wired and/or wireless) can be used for connection. For communicating via the at least one physical standard network suitable transceiver modules may be arranged in the respective entities/devices.

In addition, the computers 242.1, 242.2, 242.3 have equal rights, something which distinguishes them from a server-client structure.

The depicted nodes 242.1, 242.2, 242.3 (each) comprise a peer-to-peer application 238. As can be seen from FIG. 2, the same peer-to-peer application 238 is preferably implemented on each node 242.1, 242.2, 242.3. The peer-to-peer application 238 may preferably be a public register 238 that can, in particular, be inspected by all participants 242.1, 242.2, 242.3, 244, 246 (not only the nodes 242.1, 242.2, 242.3) of the peer-to-peer network 236. Each node 242.1, 242.2, 242.3 preferably has the (entire) public register 238. It may also be envisaged that only part of the register can be provided on a node (light node). In a particularly preferred embodiment, the peer-to-peer application 238 may be a block chain 238 which will be explained in more details hereinafter. It shall be understood that the peer-to-peer network may comprise further nodes. In addition, it shall be understood that also an augmented reality device can be formed as a node of the peer-to-peer network.

The peer-to-peer application 238 may be configured to manage and control a plurality of (separate) augmented reality devices 202, 204. In particular, by means of the peer-to-peer application 238 two or more augmented reality devices 202, 204 (of a plurality of augmented reality devices) can be connected to each other for building a desired augmented reality system structure during a specific augmented reality process and a specific augmented reality session, respectively.

In particular, the peer-to-peer application 238 comprises a controlling means 240 configured at least to control the establishment of at least one data connection 230 between at least two augmented reality devices 202, 204. The controlling means 240 is configured to control the establishment of the data connection 230, in particular, based on a first communication data set related to the first communication module 226 and a second communication data set related to the second communication module 228. In order to enable an establishment of the data connection 230 the controlling means 240 is configured to provide the first and second communication data set(s) to the respective augmented reality devices 202, 204. The augmented reality devices 202, 204, in particular, by means of the respective first and second communication modules 226, 228 can then establish the data connection 230.

Preferably, the first communication module 226 can initiate the establishment of a data connection 230 based on the second communication data set comprising communication data, such as address data of the second communication module 228, capabilities (max. data rate, available protocol(s)) of the second communication module 228, encrypting key of the second communication module 228, etc. Based on this data, a request message for establishing the data connection 230 can be send to the second communication module 228 from the first communication module 226.

Based on the first communication data set comprising similar data as the second communication data set, the second communication module 228 may respond to the request message of the first communication module 226 in order to set-up the data connection 230. In addition, by providing the first communication data set to the second communication module 228 a security means, such as a firewall or the like, of the second augmented reality device 204 may allow a request message sent by the first communication module 226 specified in the first communication data set to pass the security means. In one scenario a data connection can be set up by the underlying physical network infrastructure. Communication may be validated via signed peer-to-peer messages.

It shall be understood that according to other variants of the present invention, only a second communication data set may be provided to the first communication module. A data connection with a second communication module may be established by the first communication module only based on the second communication data set.

Each of the augmented reality device 202, 204 comprises a peer-to-peer module 244, 246. The first augmented reality device 202 comprises at least one first peer-to-peer module 244 and the second augmented reality device 204 comprises at least one second peer-to-peer module 246.

A peer-to-peer module 244, 246 is (generally) configured to communicate at least with the peer-to-peer network 236, i.e. the nodes 242.1, 242.2, 242.3 of the peer-to-peer network 236. In other words, the peer-to-peer module 244, 246 or the augmented reality device 202, 204 corresponding or assigned to the respective first and second peer-to-peer module 244, 246 is at least a participant of the peer-to-peer network 236. Preferably, all participants 242.1, 242.2, 242.3, 244, 246 (including all nodes) of the peer-to-peer network 236 are known to each participant 242.1, 242.2, 242.3, 244, 246 of the peer-to-peer network 236.

In the present case, the first and second peer-to-peer modules 244, 246 are not nodes of the peer-to-peer network 236 but only participants 244, 246. While the nodes 242.1, 242.2, 242.3 or computers 242.1, 242.2, 242.3 in the peer-to-peer network 236 comprise at least a part of the peer-to-peer application 238, a participant of a peer-to-peer network 236, like the present peer-to-peer modules 244, 246, does not comprise the peer-to-peer application 238. Such a peer-to-peer module 244, 246 is configured to provide (only) access to the peer-to-peer application 238 e.g. via an API (application programming interface). Each peer-to-peer module 244, 246 (also a node or light node) may comprise a decentral application and at least an API. In the case, the peer-to-peer module is formed as a node of the peer-to-peer network the peer-to-peer module (also) comprises at least partly the peer-to-peer application 238. It shall be understood that a first peer-to-peer module 244, 246 might be a node of the peer-to-peer network.

Preferably, the controlling means 240 can control the establishment of the data connection 230 by providing the first communication data set to the second peer-to-peer module 246 and/or by providing the second communication data set to the first peer-to-peer module 244. A communication data set, in particular, a communication address, can be forwarded by a peer-to-peer module 244, 246 to a communication module 226, 228. Based on the at least one provided communication data set, the respective communication module 226, 228 may create the data connection 230, as described above.

For instance, the controlling means 240 can be configured to send at least one message comprising a communication data set to the respective peer-to-peer module 244, 246. By way of example, a communication data set can be provided to the respective peer-to-peer module 244, 246 by enabling the respective peer-to-peer module 244, 246 to read out the respective communication data set stored in the peer-to-peer application 238. For instance, prior to reading out the communication data set, the respective peer-to-peer module 244, 246 can receive a trigger information for reading out a communication data set from the controlling means 240. The initiating of the provision of the at least one communication data set can be based on a trigger action, e.g. caused by a peer-to-peer module and/or a means of the peer-to-peer application, such as a smart contract e.g. in form of an augmented reality transaction agreement. According to one embodiment, the controlling means may be at least part of a smart contract e.g. in form of a augmented reality transaction agreement As can be seen, a manipulation of an augmented reality process can be prevented since the controlling means 240 of the peer-to-peer application 238 are executed by (in the present case) three computer nodes 242.1, 242.2, 242.3. In other words, the establishment of a data connection 230 is controlled and managed by at least a part of the nodes 242.1, 242.2, 242.3 of the peer-to-peer network 236.

Figure 3:
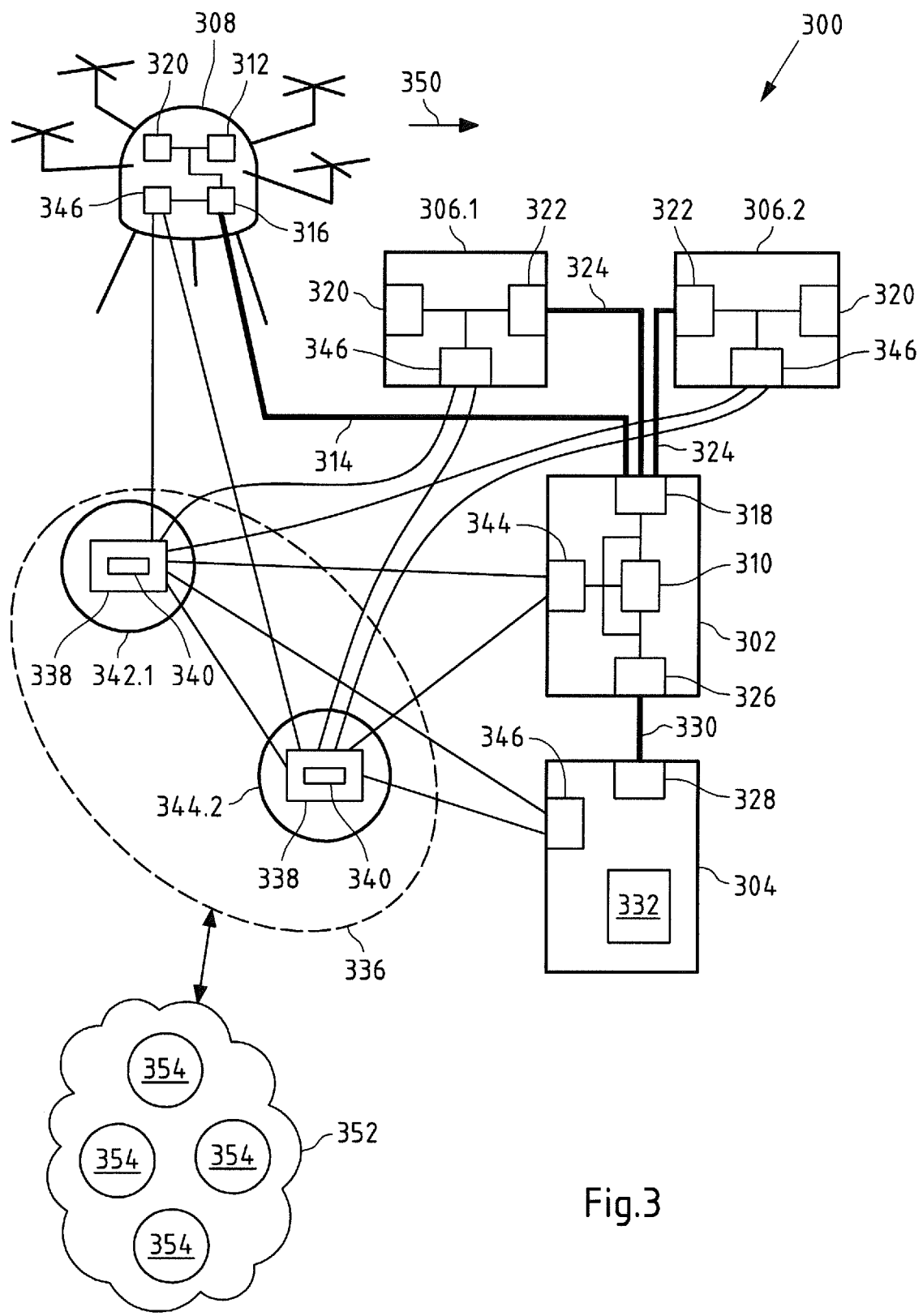
FIG. 3 shows a schematic view of a further embodiment of an augmented reality system according to the present invention.

FIG. 3 shows a further embodiment of an augmented reality system 300 according to the present invention. The present augmented reality system 300 comprises a plurality of augmented reality devices 302, 304, 306.1, 306.2, 308, a peer-to-peer network 336 and at least one storage arrangement 352 controlled by the peer-to-peer application 338 of the peer-to-peer network 336.

More particularly, the depicted system 300 comprises a first augmented reality device 302 in form of a generation device 302. The generation device comprises at least one augmented reality engine 310 configured to generate at least one augmented reality image data set. It shall be understood that an augmented reality system may comprise two or more generation devices controllable by the peer-to-peer application, in particular, the controlling means of the peer-to-peer application. In particular, two or more generation devices can be operated and controlled at least partly in parallel. For instance, two or more augmented reality session can be at least partly performed in parallel to each other. Thereby, it is possible that at least one augmented reality device can be used in two parallel performed reality session (at the same time).

The depicted generation device 302 comprises a first peer-to-peer module 344, at least one augmented reality engine 310 and two first communication modules 326, 318. It shall be understood that the two first communication modules 318, 326 can be formed by a single first communication module. It shall be further understood that a generation device may comprise three or more (different) communication modules e.g. for using (different) standard network connections.

Furthermore, four second augmented reality devices 304, 306.1, 306.2, 308 are exemplified depicted. Each of the second augmented reality devices 304, 306.1, 306.2, 308 comprises a second peer-to-peer module 346 and a second communication module 316, 322, 328. It shall be understood that a second augmented reality device may comprise two or more (different) communication modules e.g. for using (different) standard network connections.

The second augmented reality device 304 in form of a visualization device 304, such as mobile phone, tablet computer, beamer, etc., may comprise at least one visualization module 332 configured to display at least one augmented reality image data set received via the second communication module 328.

In addition, the depicted system 300 comprises three second augmented reality devices 306.1, 306.2, 308 in form of data source devices 306.1, 306.2, 308. More particularly, two data source devices 306.1, 306.2 may be configured to provide information element data set(s). For instance, each of these devices 306.1, 306.2 comprises a sensor module 320 configured to measure one or more event(s)/parameter(s), such as environmental parameter(s) (e.g. meteoroidal parameter(s)), status parameter(s) of monitored device(s) and/or entity(ies), physiological parameter(s) of user(s) or animal(s), geographical parameter(s), etc. A sensor module 320 may be configured to create at least one information element data set based on the at least one measured parameter value. The created information element data set can be forwarded to the respective second communication module 322 in order to transmit the information element data set(s) via a data connection 324.

The further second augmented reality device 308 may be e.g. a mobile second augmented reality device 308 in form of a drone 308. The second augmented reality device 308 may comprise at least one camera module 312 configured to provide at least one source image data set (e.g. real-time and/or real-world video data). Further, the drone 308 may comprise at least one sensor module 320 configured to provide at least one information element data set. In particular, the sensor module 320 may be configured to measure one or more parameter(s), as described above. In addition, the at least one camera of the camera module 316 may be configured to create at least one source image data set, such as one or more source video data set(s). The data sets can be forwarded to the second communication module 316 in order to transmit the information element data set and the source image data set via a data connection 314.

As described above, the controlling means 340 is configured to control at least the establishment of one or more data connections between two or more separate augmented reality devices 302, 304, 306.1, 306.2, 308 for at least one augmented reality session.

Furthermore, the augmented reality system can be configured to identify objects used by a user, e.g. mechanical tools. The user may have authenticated himself to use an object. Alternatively, the object may identify itself via near field communication with an augmented reality device or a camera or a sensor (e.g. RFID reader) or the augmented reality device may identify an object. Preferably this object is registered in the peer-to-peer application including rules when, how and where to use it. The augmented reality system can display these rules to the user or disable the tool if it is used incorrect. In an alternative embodiment a cognitive computing devices generates a information for a user.

For instance, during an augmented reality session, the drone 308 can move along a preset path 350 (e.g. movement instructions data set can be preset and provided to the drone 308 during an augmented reality session by means of the peer-to-peer application). During the movement along the path 350, the drone 308 can transmit (real-time) video data set(s) and (real-time) information element data set(s) e.g. comprising current location parameter value(s), current speed parameter value(s), or other parameter values, such as meteorological parameter values, via the previously established data connection 314.

By way of example, during the movement of the drone 308, the drone 308 passes the (stationary) second augmented reality devices 306.1, 306.2. The controlling means 340 may be configured such that (at least) during the passing of the drone 308 at the respective second augmented reality device 306.1, 306.2 a data connection 324 is established between the respective augmented reality devices 306.1, 306.2 and the generation device 302 in order to transmit the currently measured and created information element data set(s) to the generation device 302. Then, the generation device 302 creates, in particular, by means of the augmented reality engine 310, (real-time) augmented reality image data set(s) and transmits the (real-time) augmented reality image data set(s) via the data connection 330 to the visualization device 330. The visualization device 330 may display received one or more (real-time) augmented reality image data set(s).

Preferably, the controlling means 340 is configured to flexibly set-up individual augmented reality system structures for different augmented reality sessions. By way of example only, according to a first augmented reality session the drone 308 may only pass the first data source device 306.1. For this augmented reality session the controlling means 340 may only cause the establishment of a data connection 324 between said first data source device 306.1 and the generation device 302. In a subsequent augmented reality session, e.g. the drone 308 may only pass the further data source device 306.2. For this augmented reality session the controlling means 340 may only cause the establishment of a data connection 324 between said further data source device 306.2 and the generation device 302. It shall be understood that an augmented reality system may comprise a plurality of augmented reality devices which can be individually connected to one another to form individual system structures e.g. depending on individual augmented reality applications.

An augmented reality engine may be generally configured to derive real-world coordinates, independent from the camera of a coupling device, from the provided source image data set(s) (also known as image registration process). For instance, tools, such as video tracking tools, can be used by the augmented reality engine. For instance, the engine can be configured to firstly detect interest points, and/or fiducial markers, and/or optical flow in the provided source image data set(s). In a first stage, feature detection tools, like corner detection tools, blob detection tools, edge detection tools and/or thresholding tools, can be used by the engine. In a subsequent stage, the engine may be configured to restore a real-world coordinate system from the data obtained in the first stage. For instance, the engine can use tools which assume objects with known geometry (or fiducial markers) present in the scene. In some of those cases the scene 3D structure may be pre-calculated. If part of the scene is unknown simultaneous localization and mapping (SLAM) tools can be used by the engine to map relative positions. If no information about scene geometry is available, structure from motion methods, like bundle adjustment, can be used by the engine. Thereby, the engine can be configured to use mathematical tools comprising projective (epipolar) geometry tools, geometric algebra tools, rotation representation tools with exponential map, kalman and particle filters, nonlinear optimization tools, robust statistics.

In another scenario, an augmented reality engine may get geo position data and/or movement and/or motion and/or orientation data to calculate a visualization output.

In the present case, the peer-to-peer network 336 comprises two nodes 342.1, 342.2 each comprising a peer-to-peer application 338 with a controlling means 340. As described hereinbefore, the peer-to-peer application 338 may be configured such that data can be stored in the peer-to-peer application 338. Alternatively or additionally, the peer-to-peer application 338 may be configured to control at least one storage arrangement 352. Preferably, the storage arrangement 352 comprising a plurality of decentral storage units 354 may be formed as a decentral file system 352 (such as IPFS) or a decentralized object storage (such as storj) or decentral distributed database 352 (such as BigchainDB) controlled by the peer-to-peer application 338. Decentral file systems, object stores or databased may also be used to store algorithms and/or processing data for the augmented reality engine.

Decentral file systems, object stores or databased may also be used to store algorithms and/or processing data for the augmented reality engine.

In an embodiment, an augmented reality device may be a cognitive computing device, such as machine learning or artificial intelligence device, which may be included in the augmented reality system. This cognitive computing device may analyze input data (e.g. sensor, camera, human-machine interface, actor data, and the likes) in order to provide input parameters for the augmented reality engine. The input data calculated by the cognitive computing device can be parameters for the improving the visualization output and/or can include recommendation(s), important information or alerts for a human user.

In a further embodiment, a cognitive computing device may analyze input data and/or human-machine interface to evaluate if an action triggered by a human user is aligned with operations procedures and/or may prevent the user from unreasonable actions for instance during a surgery or when operating a machine or a vehicle.

Decentral file systems, object stores or databases may also be used to store algorithms, processing data, rule, registration and/or input data for cognitive computing devices.

It shall be understood that according to other variants of the present invention, at least some of the augmented reality devices may be formed by a single device. For instance, a generation device and a visualization device and/or a data source device may be formed as a single augmented reality device.

Figure 4:
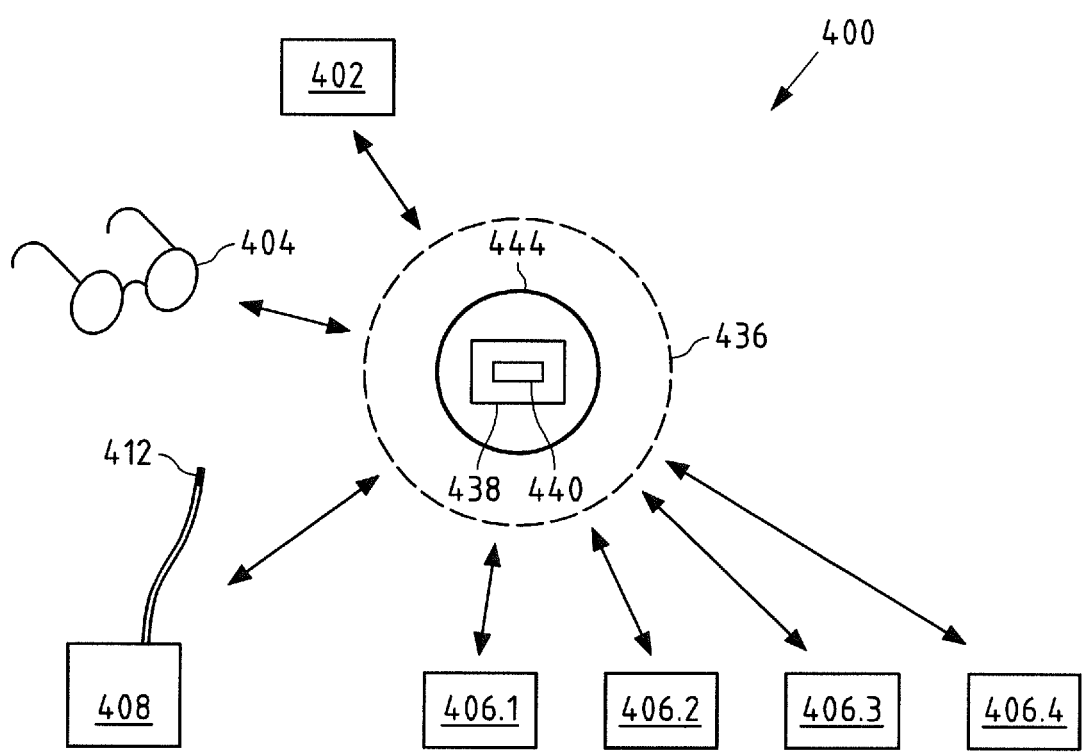
FIG. 4 shows a schematic view of a further embodiment of an augmented reality system according to the present invention.

FIG. 4 shows a further embodiment of an augmented reality system 400 according to the present invention. For the sake of clarity, some details have been omitted in the depicted embodiment. For instance, modules, such as peer-to-peer modules, display modules, communication modules, augmented reality engines, further nodes of the peer-to-peer network, data connections, etc., have been omitted (but only for the sake of clarity).

The depicted augmented reality system 400 is a medical augmented reality system 400 used e.g. for surgical treatments. The augmented reality system 400 comprises at least one visualization device 404 in form of glasses 404 wearable e.g. by a surgeon. In addition, a medical data source device 408 e.g. configured to insert a catheter or the like into a patient's body is provided. The medical data source device 408 may comprise a camera module 412 configured to create source image data set(s) during a surgeon treatment e.g. from the inside of the patient's body.

The augmented reality system 400 comprises further second augmented reality devices 406.1, 406.2, 406.3, 406.4. Each of these second augmented reality devices 406.1, 406.2, 406.3, 406.4 may comprise at least one sensor module configured to measure and provide different information element data sets comprising in particular further physiological parameter values of the patient. For instance, a first augmented reality device 406.1 may be a medical measuring augmented reality device 406.1 configured to measure one or parameter value(s) related to the circulatory system of the patient (blood pressure, heart frequency, etc.). In an embodiment body sensor(s) of a patient can be connected directly and/or via a gateway to the peer-to-peer application.

A further augmented reality device 402.2 may be a medical imaging augmented reality device 402.2, such as a magnetic resonance imaging instrument, a radiographic imaging device, a medical ultrasonography device, etc. Such an augmented reality device 402.2 may provide respective image data sets, such as magnetic resonance image data set(s) of the patient. A further augmented reality device 406.3 may be a (remotely arranged) database 406.3 comprising (confidential) patient data. Another augmented reality device 406.4 may be a medical augmented reality device 406.4 implanted in the patient's body. Also this augmented reality device 406.4 may be configured to provide one or more information element data set(s).

Further, at least one generation device 402 may be provided.

During the schedule of a (future) surgical treatment in form of an augmented reality session, two or more augmented reality devices 402, 404, 406.1, 406.2, 406.3, 406.4, 408 of the generally available reservoir of augmented reality devices 402, 404, 406.1, 406.2, 406.3, 406.4, 408 may be needed. For instance, an implanted device 406.4 may differ from surgical treatment to surgical treatment. Similar, a database 406.3 may differ from session to session. But also other devices may differ. The present invention enables to individually set-up a (medical) augmented reality system structure for each augmented reality session, such as each specific surgical treatment.

A further advantage of such as set up is that patient data and treatment data can be directly combined with an augmented reality system using the identity of a patient in order to prevent human errors by providing the correct data during a surgery. Patient data and/or treatment data can be preferably stored as health records in another or the same peer-to-peer application.

By means of the peer-to-peer application, an augmented reality transaction agreement about at least one augmented reality action can be generated for the surgical treatment and session, respectively. For instance, a surgeon or other user can cause the generation of an augmented reality transaction agreement by means of a peer-to-peer module of e.g. a request entity (e.g. a computing device operated by the surgeon or other user) for a first a surgical treatment. In the augmented reality transaction agreement, details, such as the needed augmented reality devices 402, 404, 406.1, 406.2, 406.3, 406.4 (e.g. the respective identifiers of said devices 402, 404, 406.1, 406.2, 406.3, 406.4), the scheduled start time and/or end time of the surgical treatment (augmented reality condition(s)), and the like, can be stored. The generation of the augmented reality transaction agreement may depend on the availability of the needed devices 402, 404, 406.1, 406.2, 406.3, 406.4 wherein the peer-to-peer application may comprise availability information of all (registered) augmented reality devices 402, 404, 406.1, 406.2, 406.3, 406.4.

A cognitive analytics device might be used to validate correct human activities and/or usage of medical tools during a surgery and to inform the users about incorrect activities and/or use of these tools.

After the generation of the augmented reality transaction agreement, the controlling means (e.g. part of the generated augmented reality transaction agreement) controls and manages the establishment of the one or more data connections between the two or more devices 402, 404, 406.1, 406.2, 406.3, 406.4 specified in the augmented reality transaction agreement. For instance, based on the two or more identifiers of the devices 402, 404, 406.1, 406.2, 406.3, 406.4 the controlling means may provide the respective communication data sets (e.g. stored in the peer-to-peer application and/or a storage arrangement controlled by the peer-to-peer application) to the respective peer-to-peer modules.

Then, based on e.g. a trigger information (which is based on the one or more specified augmented reality duration condition) of the controlling means, the respective communication modules establish the respective one or more data connection in order to set-up a desired medical augmented reality system structure for the augmented reality session. After the surgical treatment and, in particular, based on a specified augmented reality duration condition the controlling means may trigger the respective communication modules via the respective peer-to-peer modules to disconnect the one or more data connections. Afterwards, a new structure can be set-up based on a further augmented reality transaction agreement. In a simple and flexible manner, the best set-up for a specific surgical treatment or other augmented reality process can be established by means of the peer-to-peer application.

Figure 5:
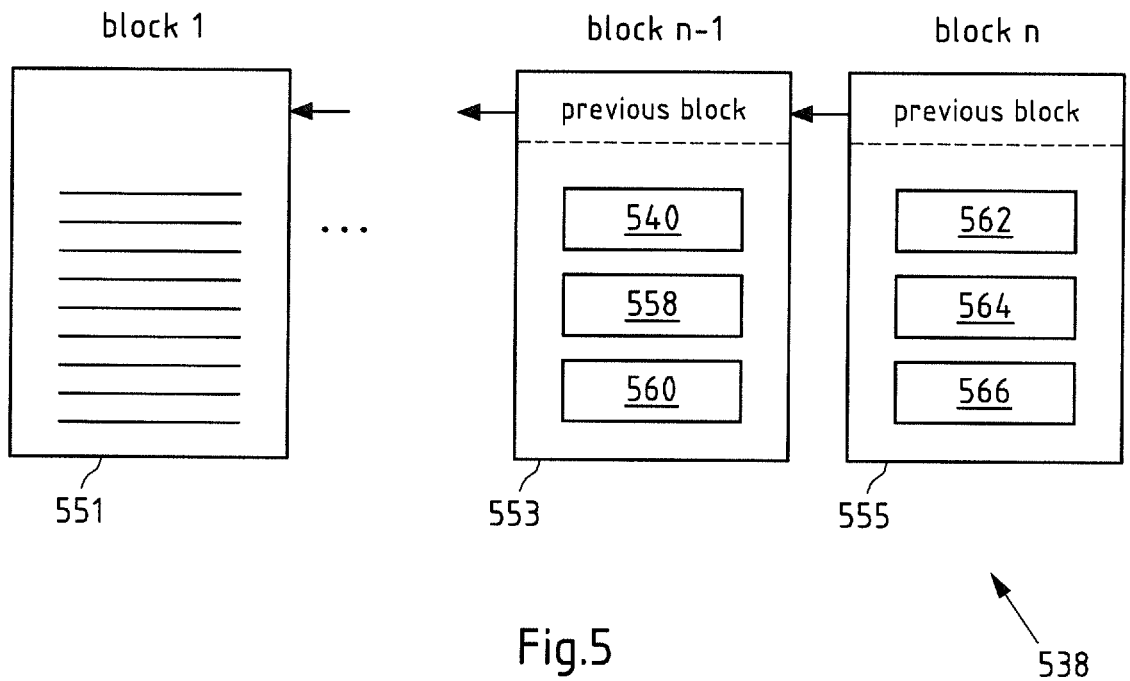
FIG. 5 shows a schematic view of an embodiment of a peer-to-peer application according to the present invention.

FIG. 5 shows a schematic view of an embodiment of a peer-to-peer application 538 according to the present invention.

The depicted peer-to-peer application 538 is a register readable, in particular, by the participants of the peer-to-peer network. Thereby, data set(s) e.g. in form of messages can be written and/or read into/from the register 538 by a first and/or second peer-to-peer module of an augmented reality device and/or another peer-to-peer module of another entity of the peer-to-peer network. In a preferred embodiment, the peer-to-peer application 538 may be a block chain 538.

Hereinafter, it is assumed in the following description of the present embodiment that the at least one peer-to-peer application 538 is a block chain 538. However, the following remarks can be easily transferred to other peer-to-peer applications, such as a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In further embodiments of the peer-to-peer application the block chain can be a permissionless or permissioned block chain. In a specific case the block chain can be public, consortium or private block chain.

In a further embodiment, the peer-to-peer application can be formed with multiple block chains which are connected via mechanisms such as side chains or smart contracts. Interoperability among block chains can be established.

The block chain 538 is formed by at least one block 551, 553, 555, preferably by a plurality of interconnected blocks 551, 553, 555. The first block 551 may also be called genesis block 551. As can be seen, a block 553, 555 (except for the first block 551) refers to each previous block 551, 553. A new block can be created by a computationally intensive process (for example, so called "mining" or through another appropriate process, such as voting) and will be particularly provided to all nodes and/or participants of the peer-to-peer network.

The present block chain 538 is particularly adapted to receive messages and data, respectively, such as communication data set(s), identifier(s), registering message(s), request message(s), etc., from a peer-to-peer module of e.g. a previously described augmented reality device or request entity. Further, the block chain 538 is particularly adapted to save these messages/data in the block chain 538. Furthermore, the block chain 538 may be configured to generate messages e.g. based on a controlling means 540 and/or an augmented reality transaction agreement 558, such as the execution of code of the controlling means 540 and/or an augmented reality transaction agreement 558, or caused by a peer-to-peer module. In particular, the block chain 538 is at least configured to control and manage an augmented reality system, such as shown in FIGS. 2, 3 and/or 4.

In particular, a (newly) received message/data set can be saved and published in the current block 555 of the block chain 538. Due to the configuration of a block chain 538 as a public register 538, said data message(s)/data set(s) of e.g. a peer-to-peer module can be read by preferably all participants of the peer-to-peer network. Alternatively or additionally, data of a message may be stored on a decentral file service or distributed block chain database controlled by the block chain 538.

As already described, in the present block chain 538 different types of messages and data sets, respectively, for example, within a smart contract (algorithm and/or storage at the block chain 538) can be processed and/or stored. In the present example, the block chain 538 comprises a controlling means 540 in form of a smart contract 540. As previously described the controlling means 540 may be configured to manage and control at least a (temporary) establishment of at least one data connection between the respective communication modules of at least two augmented reality devices which should be at least temporarily connected during an augmented reality session.

Furthermore, in the block chain 538 one or more augmented reality transaction agreement(s) 558 may be stored. It is noted that the controlling means 540 may be part of an augmented reality transaction agreement 558. An augmented reality transaction agreement 558 may be generated based on an initiation of at least one request entity requesting the use of two or more augmented reality devices for at least one augmented reality session. It may be possible that an augmented reality transaction agreement 558 may be generated between two entities, such as a request entity which desires to at least temporarily use two or more augmented reality devices during an augmented reality session and a provider entity which provides said at least two augmented reality devices. An augmented reality transaction agreement can, in particular, be used to define the structure of an augmented reality system during a specific augmented reality session. An example of a generation of such an augmented reality transaction agreement 558 will be described in the following:

An augmented reality transaction agreement 558 may comprise at least one of the following data:

Augmented reality duration condition: Condition(s) determining the start and/or end of an augmented reality process/session Identifier(s): One or more identifier(s) of the involved augmented reality devices, such as an identifier of a first augmented reality device, an identifier of the at least one second augmented reality device, etc.

Augmented reality access criterion: Criterion that must be fulfilled by a request entity for establishing and operating a desired augmented reality system structure during an augmented reality session Augmented reality action(s): Actions(s) performed by at least one of the augmented reality devices The augmented reality criterion may be e.g. an amount of cryptocurrency e.g. per time unit or the like which has to be transferred prior to, during and/or after the augmented reality session. Preferably, at least a part of the agreed amount of cryptocurrency can be locked by the peer-to-peer application 538 prior to the augmented reality session. It shall be understood that other transaction criteria and further information can be included in an augmented reality transaction agreement. More information/criteria can be, for example, a time stamp, an ID of the transaction and the like. It shall be also understood that the augmented reality criterion can be omitted according to other variants of the present invention.

In order to generate an augmented reality transaction agreement 538, a peer-to-peer module of a request entity (which might be an augmented reality device, such as a visualization device) and the peer-to-peer application (e.g. by means of the controlling means 540 and/or other means configured to generate a respective agreement of the peer-to-peer application 538) and/or a peer-to-peer module of a provider entity can exchange augmented reality request and response (acceptance) messages via the peer-to-peer application 538. A request message 560 may comprise indications about the above data (identifiers of desired augmented reality devices, transaction criteria, desired augmented reality duration condition(s), etc.).

For instance, a request entity may send by its peer-to-peer module at least one request message 560 to the peer-to-peer application 538. The request message may comprise two or more identifiers of desired augmented reality devices, one or more desired augmented reality action(s), desired augmented reality duration condition(s), at least one augmented reality transaction criterion, and the like.

Based on this information, e.g. identifiers and desired augmented reality action(s), the required data connection(s) can be derived. In other embodiments, the one or more data connection(s) can also be stored and specified in the augmented reality transaction agreement 538.

Another message 562 may be a response message 562 in form of an acceptance message 562 sent by a means of the peer-to-peer application and/or a peer-to-peer module of a provider entity. An acceptance message 562 may comprise identical or at least similar data details as compared with a request message 560. Additionally, the acceptance message

562 can comprise a reference indication to a previous request message 560, such as the ID of the request message 560.

If, for example, the acceptance message 562 comprises a higher or other transaction criterion and/or another desired augmented reality duration condition(s), other augmented reality device(s), other data connections, etc., the acceptance message 562 can be called a counter-offer message. This can be accepted by the peer-to-peer module of the request entity through an acceptance message. Based on this a peer-to-peer module of a request entity and/or provider entity may cause the generation of an augmented reality transaction agreement 558 about at least one augmented reality process and augmented reality session, respectively.

In particular, there can be multiple request messages and/or accepting messages. The peer-to-peer application and/or each request entity and/or provider entity can give guidelines, according to which at least one augmented reality transaction agreement 558 or other agreements can be generated. In a preferably automated, such as iterative process, each request message can be associated to an optimally corresponding acceptance message. The block chain 538 may be configured to generate, based on the messages of a peer-to-peer module, an augmented reality transaction agreement 558.

Further, the controlling means 540 may be configured to control the establishment of at least one data connection between at least two augmented reality devices based on the one or more augmented reality transaction agreement(s) 558. The controlling means 540 may be executed by at least part of the nodes of the peer-to-peer network for providing at least one communication data set to at least one of the first and second peer-to-peer modules of the at least two augmented reality devices.

In addition, at least prior to providing the at least one communication data set, the controlling means 540 may conduct an authorization process, e.g. an augmented reality authorization evaluation process. For instance, based on a stored augmented reality duration condition and stored identifiers, the peer-to-peer application 538, in particular, the controlling means 540 may allow the operation of two or more augmented reality devices and the establishment of at least one data connection. For instance, prior to the generation of an augmented reality transaction agreement 558, the identifier of a request entity sending a request message can be compared with stored authorized identifiers. Only in the case the received identifier corresponds to a stored identifier, the request message can be further processed e.g. by responding with an acceptance message and/or the generation of an augmented reality transaction agreement. Thereby, the establishment of one or more data connection(s) between two or more devices can be controlled and initiated by the controlling means in accordance with an augmented reality start condition and/or can be disconnected in accordance with an augmented reality end condition.

Moreover, a block chain 538 may comprise a registering means 564 configured to register a (new) augmented reality device and/or request entity in the block chain 538 as a smart asset. The registering means 564 may be configured to store preferably each identifier of each registered augmented reality device and/or of each registered request entity in an identifier list 566. Means of the peer-to-peer application 538, such as the controlling means 540, is configured to access the list in order to conduct an augmented reality authorization evaluation process.

In addition, an identity and access management system for users including authentication data can be established on the block chain 538 using the registration means 564.

Additional information can be stored in the list 566 (e.g. associated with the respective identifier). For instance, permission(s) may be associated with an identifier. In particular, different request entities may have different permissions. For instance, a first request entity may have permissions to use a first set of augmented reality devices while a further request entity may have the permissions to use a further set of augmented reality devices. The two sets may at least partly differ from each other.

In addition, one or more communication data set(s) related to an augmented reality device can be stored together with the identifier of said augmented reality device in the identifier list 566.

Figure 6:
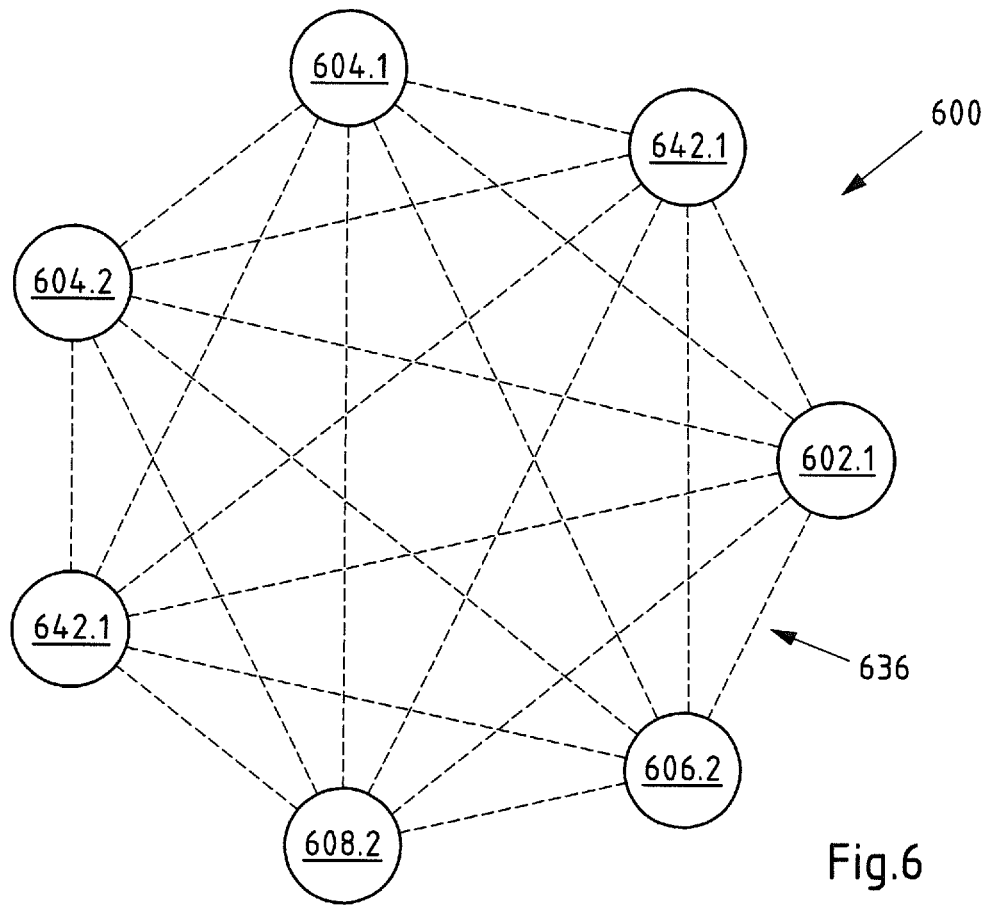
FIG. 6 shows a schematic view of a further embodiment of an augmented reality system according to the present invention.

FIG. 6 shows a schematic view of another embodiment of an augmented reality system 600 of the invention. In the present embodiment only nodes and participants 602.1, 604.1, 604.2, 606.2, 608.2, 642.1 of the peer-to-peer network 636 are shown. In the present example, it is assumed that all 602.1, 604.1, 604.2, 606.2, 608.2, 642.1 comprise the peer-to-peer application (not shown).

The node 602.1 may correspond to a first augmented reality device, such as a generation device. The nodes 604.1, 604.2 may correspond to second augmented reality devices (e.g. visualization devices) and e.g. be formed by the respective second peer-to-peer modules of second augmented reality devices. Similar, the nodes 606.2 and 608.2 may correspond to further second augmented reality devices. Nodes 642.1 and 642.2 may be other nodes. It shall be understood that nodes can be full, remote or light nodes.

As can be seen, two different types of peers or node computers 602.1, 604.1, 642.1 and 604.2, 606.2, 608.2 are presently illustrated. All peers 602.1, 604.1, 604.2, 606.2, 608.2, 642.1 are comprised by the peer-to-peer network 636. In the present embodiment, however, only a part of the peers 602.1, 604.1, 604.2, 606.2, 608.2, 642.1 in the present case, the peers (nodes) 602.1, 604.1, 642.1, check the validity of e.g. a controlling process, an augmented reality process, an augmented reality action and/or further data stored in the peer-to-peer application messages, such as agreements, communication data set messages, and the like.

Furthermore, only a part of the entire peers can be configured to store the peer-to-peer application and/or only a part of the peers can be configured to execute the algorithms of a smart/private contract. Since the validation/verification of e.g. identification data requires a considerable computational effort, it may be advantageous for reasons of efficiency, if only a part of the peers 602.1, 604.1, 642.1, especially particularly powerful peers 602.1, 604.1, 642.1 perform the validation and/or access controlling algorithms.

Validation and optimization can be done on-chain or off-chain, as described hereinbefore. Off-chain validation and/or optimization can be managed by the peer-to-peer application, like the code on the block chain. Powerful means in particular a high computing power. In other words, in the present case a valid entry in the peer-to-peer application, such as a block chain, is assumed if (only) a part of the peers 602.1, 604.1, 642.1 comes to a positive result. It shall be understood that only a single, especially particularly powerful peer can perform the validation and/or optimization process.

Similarly, in an alternative (not shown) embodiment, a particularly large peer-to-peer network may be divided in two or more (virtual) clusters. In a corresponding peer-to-peer network, for example, a validation will only be carried out by the members of one cluster (e.g. sharing of a block chain to improve the scalability). In a further embodiment the peer-to-peer application can be formed using multiple block chains. These block chains are connected via frameworks such as sidechains or smart contracts.

Figure 7:
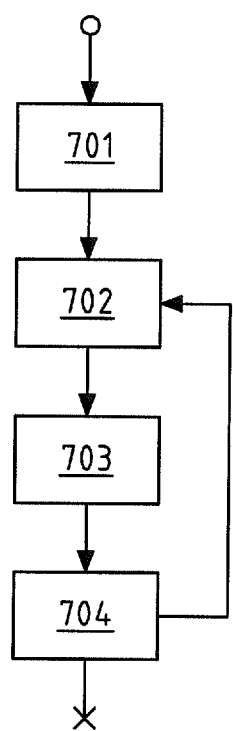
FIG. 7 shows a diagram of an embodiment of a method according to the present invention.

FIG. 7 shows a diagram of an embodiment of a method according to the present invention.

In a first (optional) step 701, the peer-to-peer application may generate an augmented reality transaction agreement for a specific augmented reality session/process e.g. caused by a request message of a request entity, as described hereinbefore.

In a next step 702, the controlling means of the peer-to-peer application may control the establishment of at least one data connection between at least a first communication module of a first augmented reality device and at least a second communication module of a second augmented reality device. For instance, the controlling means may provide at least a second communication data set to the first communication module via at least first one peer-to-peer module assigned to the first augmented reality device such that the first communication module is capable to establish the data connection based on the provided second communication data set. Preferably, during the step 702 the complete structure of the desired augmented reality system structure for the augmented reality session can be set-up under the control of the controlling means. In other words, all augmented reality devices used in the augmented reality session can be initialized and in particular connected in accordance with the augmented reality transaction agreement for said specific augmented reality session.

Then, after establishing the at least one data connection between at least two augmented reality devices, the augmented reality process can be conducted in accordance with an augmented reality application (step 703). In particular, one or more augmented reality action(s) can be conducted.

It shall be understood that a user authentication step may be included in 702 and/or 703.

After the termination of the augmented reality process, in step 704 the one or more data connection(s) can be disconnected. In particular, the controlling means of the peer-to-peer application may cause the disconnection of preferably all data connections between separated augmented reality devices e.g. by providing disconnection trigger information to the respective peer-to-peer modules.

It shall be understood that at least some of the steps can be conducted in parallel to each other. For instance, the generation of a further augmented reality transaction agreement (step 701) can be conducted during the establishment of one or more data connections related to a previously generated augmented reality transaction agreement, during the operation of an augmented reality process related to a previously generated augmented reality transaction agreement or the disconnection of one or more data connections related to a previously generated augmented reality transaction agreement. Further, after step 704, the method can be continued with step 702. In addition, two or more augmented reality sessions can be conducted at least partly in parallel to each other.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An augmented reality system, comprising:
at least one first augmented reality device and at least one second augmented reality device,
wherein the first augmented reality device comprises at least one first communication module at least temporarily connected with at least one second communication module of the second augmented reality device via at least one data connection during at least one augmented reality session,
at least one peer-to-peer network comprising at least one peer-to-peer application configured to access at least one second communication data set related to the second communication module,
wherein the peer-to-peer application comprises at least one controlling means in form of executable code, the controlling means being configured to control at least the establishment of the data connection between the first communication module and the second communication module by providing at least the second communication data set to the first communication module via at least one first peer-to-peer module assigned to the first augmented reality device such that the first communication module is capable to establish the data connection based on the provided second communication data set,
wherein the peer-to-peer network comprises a plurality of nodes, wherein at least two of the nodes of the peer-to-peer network execute at least the controlling means of the peer-to-peer application for providing the second communication data set to the first communication module, wherein the controlling means is configured to control the establishment of the data connection by conducting at least one authorization process at least prior to providing the second communication data set via the first peer-to-peer module to the first communication module, wherein the controlling means is configured to be executed by the at least two nodes of the peer-to-peer network for checking the authorization of a request entity, wherein only if all of the at least two nodes come to a positive result, the request entity is regarded as an authorized request entity.

2. The augmented reality system according to claim 1, wherein the augmented reality system comprises at least one second peer-to-peer module assigned to the second augmented reality device, and wherein the controlling means is configured to control the establishment of the data connection by providing at least one first communication data set related to the first communication module to the second communication module via the second peer-to-peer module.

3. The augmented reality system according to claim 1, wherein the peer-to-peer application is configured to generate at least one augmented reality transaction agreement about at least the establishment of at least one data connection during at least one augmented reality session, and wherein the peer-to-peer application is configured to store the generated augmented reality transaction agreement.

4. The augmented reality system according to claim 3, wherein the augmented reality system comprises at least one request entity comprising at least one peer-to-peer module, wherein the peer-to-peer module of the request entity is configured to cause generating of the augmented reality transaction agreement by transmitting at least one request message to the peer-to-peer application.

5. The augmented reality system according to claim 3, wherein the generated augmented reality transaction agreement comprises at least one of:
augmented reality criterion,
augmented reality duration condition, in particular, an augmented reality start condition and/or an augmented reality end condition,
identifier assigned to the first augmented reality device,
identifier assigned to the second augmented reality device,
information that the first and second augmented reality device should be connected,
at least one communication data set, in particular, at least the first communication data set and the second communication data set, and
at least one augmented reality action.

6. The augmented reality system according to claim 5, wherein the augmented reality action comprises at least one of:
transmitting of at least one generated augmented reality image data set,
transmitting of at least one source image data set, and
transmitting of at least one information element data set.

7. The augmented reality system according to claim 1, wherein
the controlling means is configured to provide at least one trigger information to at least the first peer-to-peer module,
wherein the trigger information is configured to initiate the establishment of the data connection by the first communication module.

8. The augmented reality system according to claim 7, wherein the controlling means is configured to provide the trigger information based on the generated augmented reality transaction agreement.

9. The augmented reality system according to claim 1, wherein
the peer-to-peer application comprises at least one registration means configured to receive a registering message of at least one peer-to-peer module of a request entity,
wherein the registration means is configured to register the request entity by storing a unique identifier of the request entity.

10. The augmented reality system according to claim 1, wherein
the peer-to-peer application comprises at least one registration means configured to receive a registering message of at least one peer-to-peer module of an augmented reality device,
wherein the registration means is configured to register the augmented reality device by storing a unique identifier of the augmented reality device.

11. The augmented reality system according to claim 4, wherein the controlling means is configured to conduct the authorization process based on stored identifiers of registered request entities and the identifier of the request entity requesting the generation of an augmented reality transaction agreement.

12. The augmented reality system according to claim 1, wherein at least one of the first augmented reality device and the second augmented reality device is at least one of:
generation device comprising at least one augmented reality engine configured to create at least one augmented reality image data set based on at least one provided source image data set and at least one provided information element data set, and/or
data source device configured to provide at least one information element data set and/or source image data set, and/or
visualization device configured to display at least one augmented reality image data set.

13. The augmented reality system according to claim 1, wherein
the at least one peer-to-peer application is a decentralized register or a shared database,
wherein the peer-to-peer application is configured to store data with given proofs or signatures.

14. The augmented reality system according to claim 1, wherein the at least one peer-to-peer application is a block chain or decentral ledger comprising at least two blocks coupled to each other.

15. A method for operating an augmented reality system, in particular, an augmented reality system according to claim 1, the method comprising:
at least temporarily establishing at least one data connection between at least one first communication module of at least one first augmented reality device and at least one second communication module of at least one second augmented reality device during at least one augmented reality session, controlling the establishment of the data connection by at least one controlling module, in form of executable code, of at least one peer-to-peer application of at least one peer-to-peer network by providing at least one second communication data set related to the second communication module to the first communication module via at least one first peer-to-peer module assigned to the first augmented reality device such that the data connection is established by the first communication module based on the provided second communication data set;

wherein the peer-to-peer network comprises a plurality of nodes, and executing, by at least two of the nodes of the peer-to-peer network, at least the controlling means of the peer-to-peer application for providing the second communication data set to the first communication module, wherein the controlling means controls the establishment of the data connection by conducting at least one authorization process at least prior to providing the second communication data set via the first peer-to-peer module to the first communication module, wherein the controlling means is executed by the at least two nodes of the peer-to-peer network for checking the authorization of a request entity, wherein only if all of the at least two nodes come to a positive result, the request entity is regarded as an authorized request entity.

16. A peer-to-peer network having stored thereon for execution a peer-to-peer application, comprising:

at least one controlling means in form of executable code, the controlling means being configured to control at least the establishment of at least one data connection between at least one first communication module of at least one first augmented reality device and at least one second communication module of at least one second augmented reality device during at least one augmented reality session by providing at least one second communication data set related to the second communication module to the first communication module via at least one first peer-to-peer module assigned to the first augmented reality device such that the first communication module is capable to establish the data connection based on the provided second communication data set, wherein the peer-to-peer network comprises a plurality of nodes, wherein at least two of the nodes of the peer-to-peer network executes at least the controlling means of the peer-to-peer application for providing the second communication data set to the first communication module, wherein the controlling means is configured to control the establishment of the data connection by conducting at least one authorization process at least prior to providing the second communication data set via the first peer-to-peer module to the first communication module, wherein the controlling means is configured to be executed by the at least two nodes of the peer-to-peer network for checking the authorization of a request entity, wherein only if all of the at least two nodes come to a positive result, the request entity is regarded as an authorized request entity.

* * * * *